(12) United States Patent
Shen et al.

(10) Patent No.: US 12,184,541 B2
(45) Date of Patent: Dec. 31, 2024

(54) SERVICE PROCESSING METHOD AND NETWORK DEVICE

(71) Applicant: Huawei Technologies Co., Ltd., Shenzhen (CN)

(72) Inventors: Kaiqiang Shen, Beijing (CN); Sheng Fang, Beijing (CN); Ruyun Zhang, Beijing (CN); Ren Tan, Beijing (CN); Hanlin Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/187,515

(22) Filed: Mar. 21, 2023

(65) Prior Publication Data

US 2023/0283544 A1  Sep. 7, 2023

Related U.S. Application Data

(63) Continuation of application No. PCT/CN2021/110707, filed on Aug. 5, 2021.

(30) Foreign Application Priority Data

Sep. 21, 2020 (CN) .......................... 202010997716.9

(51) Int. Cl.
*H04L 45/42* (2022.01)
*H04L 45/24* (2022.01)
*H04L 45/741* (2022.01)

(52) U.S. Cl.
CPC .............. *H04L 45/42* (2013.01); *H04L 45/24* (2013.01); *H04L 45/741* (2013.01)

(58) Field of Classification Search
CPC ........ H04L 45/42; H04L 45/24; H04L 45/741
See application file for complete search history.

(56) References Cited

U.S. PATENT DOCUMENTS

2014/0003232 A1* 1/2014 Guichard ............ H04L 67/1029
370/230
2016/0150459 A1* 5/2016 Patil ...................... H04W 40/28
370/328

(Continued)

FOREIGN PATENT DOCUMENTS

WO 2019179377 A1 9/2019

OTHER PUBLICATIONS

JP. Vasseur, Ed., et al., "Path Computation Element (PCE) Communrncatlon Protocol (PCEP)," RFC 5440, Mar. 2009, 87 pages.

(Continued)

*Primary Examiner* — Chris Parry
*Assistant Examiner* — Steven C Nguyen
(74) *Attorney, Agent, or Firm* — Conley Rose, P.C.

(57) ABSTRACT

A service processing method includes that a first network device determines a second network device on a forwarding path of a packet based on a service requirement; the first network device sends a first message to the second network device, to establish a first connection to the second network device; and the first network device sends a second message to the second network device using the first connection, where the second message requests the second network device to assist in determining information related to the forwarding path. when determining the second network device is needed to assist the first network device for information related to the forwarding path of the packet, the first network device actively establishes a connection to the second network device, and requests, using the established connection, the second network device to assist the first network device in determining the information related to the forwarding path.

19 Claims, 11 Drawing Sheets

(56) References Cited

U.S. PATENT DOCUMENTS

| | | | |
|---|---|---|---|
| 2017/0289020 A1* | 10/2017 | Zhao | H04L 45/42 |
| 2019/0020574 A1* | 1/2019 | Eckert | H04L 69/22 |
| 2020/0127913 A1* | 4/2020 | Filsfils | H04L 45/741 |
| 2021/0006492 A1 | 1/2021 | Yan et al. | |
| 2021/0377158 A1* | 12/2021 | Pai | H04L 45/70 |
| 2022/0200887 A1* | 6/2022 | Menon | H04L 67/51 |

OTHER PUBLICATIONS

E. Crabbe et al, "Path Computation Element Communication Protocol (PCEP) Extensions for Stateful PCE," RFC 8231, Sep. 2017, 57 pages.

Dugeon J Meuric Orange O: "PCEP Extension for Stateful Inter-Domain Tunnels," draft-dugeon-pce-stateful-interdomain-00, Internet-Draft, Oct. 27, 2017, XP015122528, 22 pages.

* cited by examiner

SERVICE PROCESSING METHOD AND NETWORK DEVICE

CROSS-REFERENCE TO RELATED APPLICATIONS

This application is a continuation application of International Patent Application No. PCT/CN2021/110707, filed on Aug. 5, 2021, which claims priority to Chinese Patent Application No. 202010997716.9, filed on Sep. 21, 2020. The disclosures of the aforementioned applications are hereby incorporated by reference in their entireties.

TECHNICAL FIELD

This application relates to the field of communication technologies, and in particular, to a service processing method and a network device.

BACKGROUND

A path computation element (PCE) is a computation element in a path computation architecture, and can implement centralized path computation that is based on various constraint conditions. A path computation client (PCC) is a client in the path computation architecture, and is configured to send a path computation request message to the PCE and establish a path connection after receiving a response that carries a path computation result. The PCE is configured to receive the path computation request message from the PCC, perform path computation based on the path computation request message, and return the path computation result to the PCC.

In some cases, the PCE usually cannot independently determine information about a forwarding path of a packet. In this case, the PCE needs to send a message to another PCC on the forwarding path, to request the PCC to assist the PCE in determining the information about the forwarding path of the packet. A dedicated Path Computation Element Communication Protocol (PCEP) is needed for communication between the PCC and the PCE. In an example, to ensure that the PCE can successfully complete path computation, a network device that may serve as the PCC and that is in a network usually needs to actively establish a PCEP session connection to the PCE in advance.

However, in some network scenarios, all network devices in the network may serve as PCCs. In these network scenarios, all the network devices in the network need to establish PCEP session connections to the PCE. In this way, a large quantity of idle session connections is likely to be generated, and high resource overheads are caused.

SUMMARY

Embodiments of this application provide a service processing method and a network device. When a first network device determines, based on a service requirement, that a second network device is needed to assist the first network device in determining information related to a forwarding path of a packet, the first network device sends a first message to the second network device, to establish a connection to the second network device, and requests, by using the established connection, the second network device to assist the first network device in determining the information related to the forwarding path. In this way, connection establishment is implemented as needed, generation of a large quantity of idle session connections is avoided, and resource overheads are reduced.

A first aspect of this application provides a service processing method. The method includes that a first network device determines a second network device on a forwarding path of a packet based on a service requirement, where the packet belongs to a service, and the first network device may be a device that has a path computation capability, for example, a controller in a network or a network device that participates in packet forwarding in the network. The first network device sends a first message to the second network device, to establish a first connection to the second network device, where the first connection may be, for example, a PCEP session connection. The first network device sends a second message to the second network device by using the first connection, where the second message requests the second network device to assist in determining information related to the forwarding path.

In this solution, when determining, based on the service requirement, that the second network device is needed to assist the first network device in determining the information related to the forwarding path of the packet, the first network device actively establishes a connection to the second network device, and requests, by using the established connection, the second network device to assist the first network device in determining the information related to the forwarding path. In this way, connection establishment is implemented as needed, generation of a large quantity of idle session connections is avoided, and resource overheads are reduced.

Optionally, in a possible implementation, the method further includes that the first network device receives a third message sent by the second network device, where the third message includes the information related to the forwarding path. The first network device receives the information that is related to the forwarding path and that is fed back by the second network device, so that the first network device can determine the forwarding path of the packet based on the second network device.

Optionally, in a possible implementation, that a first network device determines a second network device on a forwarding path of a packet based on a service requirement includes that the first network device determines, based on the service requirement, that the first network device cannot determine the information related to the forwarding path of the packet. The first network device determines the second network device, where the second network device is configured to assist in determining the information related to the forwarding path.

In other words, in a process in which the first network device determines the forwarding path of the packet, the first network device determines that the first network device needs the second network device to assist the first network device in completing computation of the forwarding path. The second network device may be a network device on the forwarding path. For example, in a scenario in which a stitching label is needed to indicate the forwarding path, the first network device may determine that the second network device is needed to allocate a corresponding stitching label. For another example, in a cross-area packet forwarding scenario, the first network device may be incapable of computing a forwarding path of the packet in another area due to lack of a topology of the other area. In this case, the first network device may determine that the second network device is needed to compute the forwarding path of the packet in the other area.

Optionally, in a possible implementation, the information related to the forwarding path includes a stitching label and/or a path label indicating the forwarding path.

Optionally, in a possible implementation, that a first network device determines a second network device on a forwarding path of a packet based on a service requirement includes that the first network device determines the forwarding path of the packet based on the service requirement; and the first network device determines, based on the forwarding path of the packet, that the second network device is a stitching node, where the second network device is configured to allocate a stitching label. That the first network device sends a second message to the second network device by using the first connection includes that the first network device sends the second message to the second network device by using the first connection, where the second message includes label stack information, and the second message requests the second network device to allocate a stitching label corresponding to the label stack information.

Optionally, in a possible implementation, that the first network device determines, based on the forwarding path of the packet, that the second network device is a stitching node includes that the first network device determines, based on the forwarding path of the packet, that a quantity of labels needed to indicate the forwarding path is greater than a maximum quantity of labels that a label stack can carry. The first network device determines the second network device based on the forwarding path, where the second network device is a network device on the forwarding path of the packet. For example, when a quantity of nodes or links that the forwarding path determined by the first network device passes through is greater than the maximum quantity of labels that the label stack can carry, a label stack indicating the forwarding path cannot completely carry all labels corresponding to the forwarding path. In this case, the first network device may determine that the stitching label is needed to indicate packet forwarding.

Optionally, in a possible implementation, that a first network device determines a second network device on a forwarding path of a packet based on a service requirement includes that the first network device determines, based on the service requirement, that the first network device cannot obtain the forwarding path of the packet through computation. The first network device determines the second network device based on a network topology, where the second network device is a network device on the forwarding path of the packet, and the second network device is configured to assist the first network device in computing a first path to a destination device.

In this solution, when the first network device cannot compute the forwarding path of the packet, the first network device requests the second network device to assist the first network device in computing a path to the destination device, so that availability and flexibility of path computation can be improved.

Optionally, in a possible implementation, that the first network device determines, based on the service requirement, that the first network device cannot obtain the forwarding path of the packet through computation includes that the first network device determines, based on the service requirement, that the destination device of the packet is not in a first area, where the first area is an area in which the first network device is located. The first network device determines the second network device based on a topology of the first area, where the second network device is boundary equipment of the first area and a second area; and the second area is an area in which the destination device is located, or the second area is an area that the forwarding path to the destination device needs to pass through.

Optionally, in a possible implementation, the second message sent by the first network device to the second network device by using the first connection requests the second network device to compute the first path to the destination device. The third message sent by the second network device to the first network device includes indication information of the first path.

Optionally, in a possible implementation, the method further includes that the first network device determines a third network device based on the network topology, where the third network device is boundary equipment of the first area and the second area. The first network device establishes a second connection to the third network device. The first network device sends a fourth message to the third network device by using the second connection, where the fourth message requests the third network device to compute a second path to the destination device. The first network device receives a fifth message sent by the third network device, where the fifth message includes indication information of the second path. The first network device determines a part or all of the forwarding path of the packet based on the third message and the fifth message.

In other words, when the first network device determines that both the second network device and the third network device are boundary equipment of the first area and the second area, the first network device may establish PCEP session connections to the second network device and the third network device, to request the second network device and the third network device to compute paths to the destination device. After the first network device obtains path indication information separately returned by the second network device and the third network device, the first network device determines the forwarding path of the packet by integrating the path indication information returned by the two network devices, to select a better path.

Optionally, in a possible implementation, that the first network device sends a first message to the second network device, to establish a first connection to the second network device includes that the first network device establishes a Transmission Control Protocol (TCP) connection to the second network device. The first network device sends the first message to the second network device by using the TCP connection, to negotiate with the second network device to establish the first connection.

Optionally, in a possible implementation, the first network device may be a head-end node device on the forwarding path of the packet or a controller. For example, the first network device is a network head-end node or ingress node that the packet passes through on an end-to-end forwarding path. In an example, the first network device may be an endpoint device of a tunnel, a boundary node of a network domain, or the like. Alternatively, in some possible application scenarios, the first network device is a controller having a network management function.

Optionally, in a possible implementation, both the first network device and the second network device are path computation client PCC devices on the forwarding path.

Optionally, in a possible implementation, the forwarding path of the packet includes one or more of a segment routing (SR) policy path, an SR over Internet Protocol version 4 (SRv4) path, an SR over Internet Protocol version 6 (SRv6) path, an SR traffic engineering (SR-TE) path, and a multiprotocol label switching (MPLS) traffic engineering (MPLS-TE) path.

A second aspect of this application provides a network device. The network device is a first network device, and includes a processing unit and a transceiver unit. The processing unit is configured to determine a second network device on a forwarding path of a packet based on a service requirement, where the packet belongs to a service. The transceiver unit is configured to send a first message to the second network device, to establish a first connection to the second network device. The transceiver unit is further configured to send a second message to the second network device by using the first connection, where the second message requests the second network device to assist in determining information related to the forwarding path.

Optionally, in a possible implementation, the transceiver unit is further configured to receive a third message sent by the second network device, where the third message includes the information related to the forwarding path.

Optionally, in a possible implementation, the processing unit is configured to determine, based on the service requirement, that the first network device cannot determine the information related to the forwarding path of the packet; and determine the second network device, where the second network device is configured to assist in determining the information related to the forwarding path.

Optionally, in a possible implementation, the information related to the forwarding path includes a stitching label and/or a path label indicating the forwarding path.

Optionally, in a possible implementation, the processing unit is further configured to determine the forwarding path of the packet based on the service requirement; and determine, based on the forwarding path of the packet, that the second network device is a stitching node, where the second network device is configured to allocate a stitching label. The transceiver unit is configured to send the second message to the second network device by using the first connection, where the second message includes label stack information, and the second message requests the second network device to allocate a stitching label corresponding to the label stack information.

Optionally, in a possible implementation, the processing unit is further configured to determine, based on the forwarding path of the packet, that a quantity of labels needed to indicate the forwarding path is greater than a maximum quantity of labels that a label stack can carry; and determine the second network device based on the forwarding path, where the second network device is a network device on the forwarding path of the packet.

Optionally, in a possible implementation, the processing unit is further configured to determine, based on the service requirement, that the first network device cannot obtain the forwarding path of the packet through computation; and determine the second network device based on a network topology, where the second network device is a network device on the forwarding path of the packet, and the second network device is configured to assist the first network device in computing a first path to a destination device.

Optionally, in a possible implementation, the processing unit is further configured to determine, based on the service requirement, that the destination device of the packet is not in a first area, where the first area is an area in which the first network device is located; and determine the second network device based on a topology of the first area, where the second network device is boundary equipment of the first area and a second area; and the second area is an area in which the destination device is located, or the second area is an area that the forwarding path to the destination device needs to pass through.

Optionally, in a possible implementation, the second message sent by the first network device to the second network device by using the first connection requests the second network device to compute the first path to the destination device, and the third message includes indication information of the first path.

Optionally, in a possible implementation, the processing unit is further configured to determine a third network device based on the network topology, where the third network device is boundary equipment of the first area and the second area. The transceiver unit is configured to establish a second connection to the third network device; send a fourth message to the third network device by using the second connection, where the fourth message requests the third network device to compute a second path to the destination device; and receive a fifth message sent by the third network device, where the fifth message includes indication information of the second path. The processing unit is further configured to determine a part or all of the forwarding path of the packet based on the third message and the fifth message.

Optionally, in a possible implementation, the first connection includes a path computation element communication protocol PCEP connection.

Optionally, in a possible implementation, the transceiver unit is further configured to establish a TCP connection to the second network device; and send the first message to the second network device by using the TCP connection, to negotiate with the second network device to establish the first connection.

Optionally, in a possible implementation, the first network device is a head-end node device on the forwarding path of the packet. Alternatively, in some possible allowed scenarios, the first network device may be a controller.

Optionally, in a possible implementation, both the first network device and the second network device are path computation client PCC devices on the forwarding path.

Optionally, in a possible implementation, the forwarding path of the packet includes one or more of an SR policy path, an SRv4 path, an SRv6 path, an SR-TE path, and an MPLS-TE path.

A third aspect of this application provides a network device. The network device includes a processor, configured to enable the network device to implement the method according to any of the possible implementations of the first aspect. The device may further include a memory. The memory is coupled to the processor. When the processor executes instructions stored in the memory, the network device may be enabled to implement the method according to any of the possible implementations of the first aspect. The device may further include a communication interface. The communication interface is used by the apparatus to communicate with another device. For example, the communication interface may be a transceiver, a circuit, a bus, a module, or a communication interface of another type.

In this application, the instructions in the memory may be stored in advance, or may be stored after being downloaded from the Internet when the network device is used. A source of the instructions in the memory is not limited in this application. The coupling in this application is an indirect coupling or a connection between apparatuses, units, or modules, may be in an electrical form, a mechanical form, or another form, and is for information exchange between the apparatuses, the units, or the modules.

A fourth aspect of this application provides a computer storage medium. The computer storage medium may be non-volatile. The computer storage medium stores computer-readable instructions. When the computer-readable instructions are executed by a processor, the method according to any of the possible implementations of the first aspect is implemented.

A fifth aspect of this application provides a computer program product including instructions. When the computer program product runs on a computer, the computer is enabled to perform the method according to any of the possible implementations of the first aspect.

A sixth aspect of this application provides a network system. The network system includes the network device according to any one of the implementations of the second aspect or the third aspect and one or more other network devices configured to cooperate with the network device to perform computation or obtain information related to a forwarding path.

A seventh aspect of this application provides a chip, including a processor. A part or all of the processor is configured to read and execute a computer program stored in a memory, to perform the method according to any one of the possible implementations of any one of the foregoing aspects. Optionally, the chip includes the memory, and the memory is connected to the processor through a circuit or a wire. Further, optionally, the chip further includes a communication interface, and the processor is connected to the communication interface. The communication interface is configured to receive to-be-processed data or information. The processor obtains the data and/or the information through the communication interface, processes the data and/or the information, and outputs a processing result through the communication interface. The communication interface may be an input/output interface. The method provided in this application may be implemented by one chip, or may be cooperatively implemented by a plurality of chips.

The solutions provided in the second aspect to the seventh aspect are for implementing or cooperatively implementing the method provided in the first aspect. Therefore, beneficial effects the same as or corresponding to those in the first aspect can be achieved. Details are not described herein again.

DESCRIPTION OF EMBODIMENTS

Figure 1:
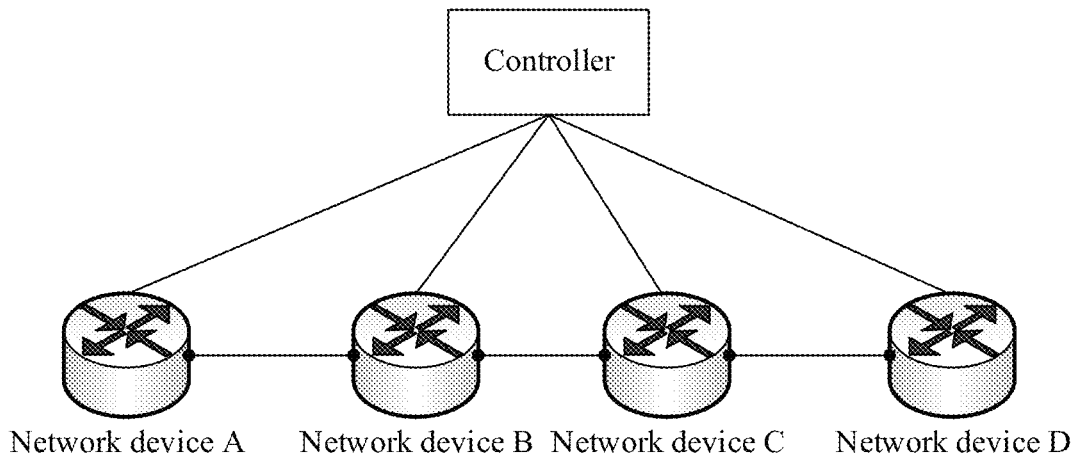
FIG. 1 is a schematic diagram of a structure of a network architecture according to an embodiment of this application.

To make objectives, technical solutions, and advantages of this application clearer, the following describes embodiments of this application with reference to the accompanying drawings. It is clear that the described embodiments are merely a part rather than all of embodiments of this application. A person of ordinary skill in the art may learn that, as a new application scenario emerges, the technical solutions provided in embodiments of this application are also applicable to a similar technical problem.

In the specification, claims, and accompanying drawings of this application, terms such as "first" and "second" are intended to distinguish between similar objects but do not necessarily indicate a specific order or sequence. It should be understood that data termed in such a way is interchangeable in proper circumstances, so that embodiments described herein can be implemented in an order other than the order illustrated or described herein. In addition, terms "include", "have" and any variant thereof are intended to cover non-exclusive inclusion, for example, a process, method, system, product, or device that includes a list of steps or modules is not necessarily limited to those steps or modules that are expressly listed, but may include other steps or modules not expressly listed or inherent to such a process, method, product, or device. Names or numbers of steps in this application do not mean that the steps in the method procedure need to be performed in a time/logical sequence indicated by the names or numbers. An execution sequence of the steps in the procedure that have been named or numbered can be changed based on a technical objective to be achieved, provided that same or similar technical effects can be achieved. Division into units in this application is logical division, and may be implemented in another division manner in an actual application. For example, a plurality of units may be combined or integrated into another system, or some features may be ignored or not performed. In addition, the displayed or discussed mutual couplings or direct couplings or communication connections may be implemented through some interfaces. The indirect couplings or communication connections between the units may be implemented in an electrical form or other similar forms. This is not limited in this application. In addition, units or subunits described as separate parts may or may not be physically separate, may or may not be physical units, or may be distributed into a plurality of circuit units. Some or all of the units may be selected based on actual requirements to achieve the objectives of the solutions of this application.

PCEP is a protocol for information exchange between a PCE and a PCC. The PCC may send a path computation request message to the PCE based on a PCEP session connection. After receiving the path computation request message, the PCE performs path computation based on the path computation request message, and returns a path computation result to the PCC based on the PCEP session connection.

In some cases, for example, when a stitching label is needed to indicate a path, the PCE usually cannot independently determine information about a forwarding path of a packet. In this case, the PCE needs to send a message to another PCC on the forwarding path, to request the PCC to assist the PCE in determining the information about the forwarding path of the packet. In the foregoing scenario, the PCE may be understood as a controller, and the PCC may be understood as a network device that interacts with the controller and that is configured to perform packet forwarding. To implement various possible functions including a path computation function, the PCE serving as the controller usually needs to establish, in advance, communication connections to all PCCs managed and controlled by the PCE. For example, the PCE establishes, by using the PCEP protocol, the connections to all the PCCs managed and controlled by the PCE, to perform communication. Otherwise, some functions of the controller may be incapable of being implemented normally.

However, in some network scenarios, all network devices in a network may serve as PCCs. In these network scenarios, all the network devices in the network need to establish PCEP session connections to the PCE. In this way, a large quantity of idle session connections is likely to be generated, and high resource overheads are caused. FIG. 1 is a schematic diagram of a structure of a network architecture according to an embodiment of this application. As shown in FIG. 1, the network architecture includes a controller, a network device A, a network device B, a network device C, and a network device D. The controller is a PCE, and the network device A is a PCC. The network device A may serve as an initiator to establish a PCEP session connection to the controller in advance. In this way, when the network device A needs to determine a forwarding path of an obtained packet, the network device A may send a path computation request to the controller by using the PCEP session connection, to request the controller to compute the forwarding path of the packet. When the controller computes the forwarding path of the packet, the controller may need another network device in a network to assist the controller in determining information related to the forwarding path of the packet. For example, the controller may need the network device B, the network device C, or the network device D to assist the controller in determining the information related to the forwarding path of the packet. The controller needs to exchange information with the other network device in the network based on a PCEP session connection. In an example, to ensure that the controller can successfully complete computation of the forwarding path of the packet, the network device B, the network device C, and the network device D all need to serve as initiators to establish PCEP session connections to the controller in advance. However, in an actual case, the controller may only need to establish a PCEP session connection to the network device B. In an example, if all the network devices in the network establish the PCEP session connections to the PCE, a large quantity of idle session connections are likely to be generated, and high resource overheads are caused.

In view of this, embodiments of this application provide a service processing method. When a network device responsible for path computation determines that another network device is needed to assist the network device in performing path computation, the network device responsible for path computation initiates a connection establishment request to the other network device, so that connection establishment is implemented as needed, generation of a large quantity of idle session connections is avoided, and resource overheads are reduced.

Figure 2:
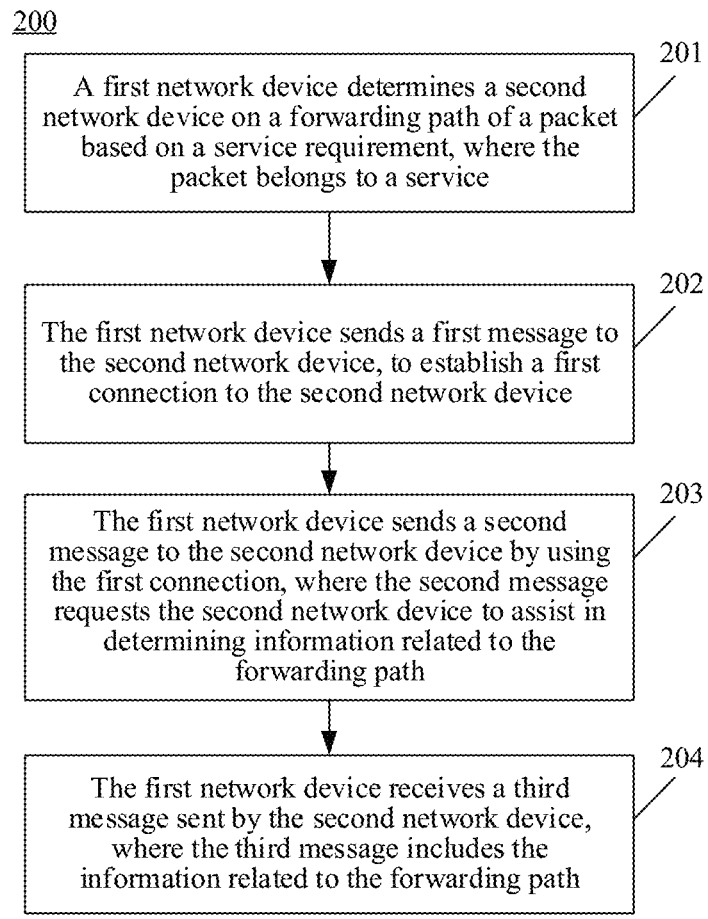
FIG. 2 is a schematic flowchart of a service processing method 200 according to an embodiment of this application.

FIG. 2 is a schematic flowchart of a service processing method 200 according to an embodiment of this application. The service processing method 200 may be applied to the network structure shown in FIG. 1.

As shown in FIG. 2, the packet processing method 200 includes at least the following steps.

Step 201: A first network device determines a second network device on a forwarding path of a packet based on a service requirement, where the packet belongs to a service.

In this embodiment, the first network device may be a device that has a path computation capability, for example, a network device that participates in packet forwarding in a network or a controller in the network. During actual deployment, the controller may be independent of a network device, or may be disposed inside a network device. The controller may also be referred to as a network management device.

When the first network device is the network device that participates in packet forwarding in the network, the first network device may be, for example, a network device on the forwarding path of the packet. The forwarding path of the packet may be a part of a complete end-to-end path for packet forwarding. For example, the forwarding path of the packet may be a forwarding path that is of the packet and is determined by the first network device and that starts from the first network device and passes through the second network device. For example, the first network device is also a device on the forwarding path of the packet, and the packet arrives at the first network device before arriving at the second network device. In a possible example, the first network device may serve as, for example, a head-end node or an ingress node. For example, the first network device is a tunnel end node, or a boundary node of a network domain, that is on the forwarding path and that the packet passes through, or the like. In some other possible scenarios, the first network device may alternatively be a node at another location on the forwarding path of the packet. However, the first network device needs to request, by using the method 200, another node on the path to assist in providing information related to the forwarding path. The second network device is a network device between the first network device and a destination device of the packet. The first network device may obtain the service requirement by receiving a to-be-forwarded packet. For example, the service requirement may be forwarding the to-be-forwarded packet to a destination address specified by the to-be-forwarded packet.

When the first network device is the controller, the first network device may obtain the service requirement by receiving a path computation request message sent by another network device connected to the first network device. The service requirement may be, for example, computing a forwarding path of the packet from a network device to another network device.

In other words, regardless of whether the first network device is the controller or the network device that participates in packet forwarding in the network, the first network device needs to determine the forwarding path of the packet based on the obtained service requirement.

In a possible embodiment, the first network device may determine, based on the service requirement, that the first network device cannot determine the information related to the forwarding path of the packet. The first network device determines the second network device, where the second network device is configured to assist in determining the information related to the forwarding path. The information related to the forwarding path may include a stitching label and/or a path label indicating the forwarding path.

In other words, in a process in which the first network device determines the forwarding path of the packet, the first network device determines that the first network device needs the second network device to assist the first network device in completing computation of the forwarding path. The second network device may be a network device on the forwarding path. For example, in a scenario in which the stitching label is needed to indicate the forwarding path, the first network device may determine that the second network device is needed to allocate a corresponding stitching label. For another example, in a cross-area packet forwarding scenario, the first network device may be incapable of computing a forwarding path of the packet in another area due to lack of a topology of the other area. In this case, the first network device may determine that the second network device is needed to compute the forwarding path of the packet in the other area. Alternatively, the first network device may indicate to the second network device to send other information related to the forwarding path.

In a possible embodiment, the forwarding path of the packet may include one or more of an SR policy path, an SRv4 path, an SRv6 path, an SR-TE path, and an MPLS-TE path. In other words, the method provided in this embodiment may be applied to computation of one or more of the SR policy path, the SRv4 path, the SRv6 path, the SR-TE path, and the MPLS-TE path.

Step 202: The first network device sends a first message to the second network device, to establish a first connection to the second network device.

In this embodiment, after the first network device determines that the first network device needs the second network device to determine the information related to the forwarding path of the packet, the first network device may send the first message to the second network device, where the first message requests to establish the first connection to the second network device.

The first connection may be a connection for exchanging information related to path computation. For example, the first connection may be a PCEP session connection. After the first network device establishes the first connection to the second network device, the first network device and the second network device may exchange the information related to the path computation. For example, the first network device may send a request message to the second network device, to request the second network device to determine the information related to the forwarding path of the packet.

It may be understood that, when the first network device is the network device on the forwarding path of the packet, the first network device has a corresponding network topology. In addition, the first network device and another network device in the network can communicate with each other through a link, and the first network device can directly establish the first connection to the second network device. When the first network device is the controller, that the controller and another network device in the network can communicate with each other through a link needs to be determined during deployment of the controller, to ensure that the controller can establish the first connection to the second network device.

Step 203: The first network device sends a second message to the second network device by using the first connection, where the second message requests the second network device to assist in determining the information related to the forwarding path.

When the first connection is the PCEP connection, the second message may be, for example, a PCEP path computation request (PCReq) message, and may request the second network device to assist in determining the information related to the forwarding path.

Step 204: The first network device receives a third message sent by the second network device, where the third message includes the information related to the forwarding path.

After the second network device receives the second message sent by the first network device, the second network device may determine, based on the second message, the information related to the forwarding path, and send the third message to the first network device, where the third message includes the information related to the forwarding path and determined by the second network device.

When the first connection is the PCEP connection, the third message may be, for example, a PCEP path computation reply (PCRep) message, and may feed back the information related to the forwarding path.

In this embodiment, when the first network device responsible for path computation determines that the second network device is needed to assist the first network device in determining the information related to the forwarding path of the packet, the first network device initiates a connection establishment request to the second network device, so that the first network device can request the second network device to assist in determining the information related to the forwarding path of the packet. In this way, connection establishment is implemented as needed, generation of a large quantity of idle session connections is avoided, and resource overheads are reduced.

The foregoing describes a process in which the first network device initiates, to the second network device based on the service requirement, a request for establishing the first connection, to exchange the information related to the forwarding path. For ease of understanding, the following describes in detail a process in which the first network device establishes the first connection to the second network device.

The following uses an example in which the first connection is the PCEP session connection. The process in which the first network device establishes the first connection to the second network device is as follows:

1. The first network device serves as an initiator, to establish a TCP connection to the second network device through a three-way handshake.
2. The first network device exchanges Open messages with the second network device, to negotiate to establish the PCEP session connection.
3. The first network device exchanges Keepalive messages with the second network device, to maintain the PCEP session connection.

In the process 1, a three-way handshake process includes that the first network device serves as the initiator, to send a connection request packet to the second network device, to request to establish the TCP connection. After receiving the connection request packet, the second network device sends an acknowledge (ack) packet to the first network device, and allocates a corresponding resource to establish the TCP connection. After receiving the ack packet sent by the second network device, the first network device also sends an ack packet to the second network device, and allocates a corresponding resource to establish the TCP connection. Through the three-way handshake process, the first network device may establish the TCP connection to the second network device.

For example, the connection request packet sent by the first network device to the second network device may be a TCP message. A packet format of the TCP message may be shown as follows:

```
 0                   1                   2                   3
 0 1 2 3 4 5 6 7 8 9 0 1 2 3 4 5 6 7 8 9 0 1 2 3 4 5 6 7 8 9 0 1 2
+-+-+-+-+-+-+-+-+-+-+-+-+-+-+-+-+-+-+-+-+-+-+-+-+-+-+-+-+-+-+-+-+
|          Source Port          |       Destination Port        |
+-+-+-+-+-+-+-+-+-+-+-+-+-+-+-+-+-+-+-+-+-+-+-+-+-+-+-+-+-+-+-+-+
|                     Acknowledgement Number                    |
+-+-+-+-+-+-+-+-+-+-+-+-+-+-+-+-+-+-+-+-+-+-+-+-+-+-+-+-+-+-+-+-+
| Data  |           |U|A|P|R|S|F|                               |
| Offset| Reserved  |R|C|S|S|Y|I|            Window             |
|       |           |G|K|H|T|N|N|                               |
+-+-+-+-+-+-+-+-+-+-+-+-+-+-+-+-+-+-+-+-+-+-+-+-+-+-+-+-+-+-+-+-+
|           Checksum            |         Urgent Pointer        |
+-+-+-+-+-+-+-+-+-+-+-+-+-+-+-+-+-+-+-+-+-+-+-+-+-+-+-+-+-+-+-+-+
|                             Options                           |
+-+-+-+-+-+-+-+-+-+-+-+-+-+-+-+-+-+-+-+-+-+-+-+-+-+-+-+-+-+-+-+-+
|                              data                             |
+-+-+-+-+-+-+-+-+-+-+-+-+-+-+-+-+-+-+-+-+-+-+-+-+-+-+-+-+-+-+-+-+
```

Fields in the TCP message are explained as follows:
Source Port: a source port number.
Destination Port: a destination port number.
Sequence Number: a sequence number.
Acknowledgment Number: an acknowledgment number.
Data Offset: a header length.
Reserved: a reserved bit.
URG: An urgent pointer is valid.
ACK: The acknowledgment number is valid.
PSH: A receiver should deliver this packet segment to an application layer as soon as possible.
RST: A connection is reestablished.
SYN: a synchronization number for initiating a connection.
FIN: A transmitter completes a transmission task.
Window: a size of a window.
Checksum: a checksum.
Urgent Pointer: the urgent pointer.
Options: options.
Data: data.
Destination Port: a destination port number.
A port number of the PCEP session connection is 4189. The first network device may establish the TCP connection to the second network device through the three-way handshake by sending a TCP message whose destination port number is 4189 to the second network device.

In the process 2, after the first network device establishes the TCP connection to the second network device, the first network device and the second network device may send the Open messages to each other, to negotiate to establish the PCEP session connection. The Open message may be, for example, the foregoing first message.

A format of the Open message may be shown as follows:
<Open Message (Open Message)>::=<Common Header (Common Header)><OPEN>

The Common Header field indicates a common header, and an OPEN object (object) indicates specific content of the Open message.

A format of the common header may be shown as follows:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Ver |  Flags  |  Message-Type |        Message-Length         |
+-+-+-+-+-+-+-+-+-+-+-+-+-+-+-+-+-+-+-+-+-+-+-+-+-+-+-+-+-+-+-+-+
```

Fields in the common header are explained as follows:
Ver (Version): a PCEP version number, where a current version number is 1.
Flags: reserved flags, unlocated and set to all 0s.
Message-Type: a type of a PCEP message, indicating a type of a current PCEP message.
Message-Length: a total length of the PCEP message, expressed in bytes.
Meanings corresponding to different values of the Message-Type field are as follows:
1 Open
2 Keepalive
3 Path computation request (PCReq)
4 Path computation reply (PCRep)
5 Notification
6 Error
7 Close
10 Path computation advertisement (Path Computation LSP State Report, PCRpt)
11 Path computation update (Path Computation LSP Update Request (PCUpd))
12 Path computation initialization request (PCEP Initiate Request (PCInitiate))
A format of the OPEN object may be shown as follows:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Ver |  Flags |   Keepalive   |    DeadTimer  |      SID      |
+-+-+-+-+-+-+-+-+-+-+-+-+-+-+-+-+-+-+-+-+-+-+-+-+-+-+-+-+-+-+-+-+
|                                                               |
|                         Optional TLVs                         |
|                                                               |
+-+-+-+-+-+-+-+-+-+-+-+-+-+-+-+-+-+-+-+-+-+-+-+-+-+-+-+-+-+-+-+-+
```

Fields in the OPEN object are explained as follows:
Ver: a PCEP version number, where a current version number is 1.
Flags: reserved flags, undefined and set to all 0s.
Keepalive: a maximum interval at which two consecutive PCEP messages are sent, expressed in seconds.
DeadTimer: timeout duration of two PCEP neighbors, and is usually four times Keepalive.
SID (PCEP session ID): identifies a sequence number of a PCEP session.
Optional TLVs: optional type-length-values (TLVs) in the OPEN object.

The foregoing describes the process in which the first network device establishes the first connection to the second network device. The following describes in detail, with reference to the accompanying drawings, processes in which the first network device requests, in different scenarios, the second network device to assist in determining the information related to the forwarding path.

Figure 3:
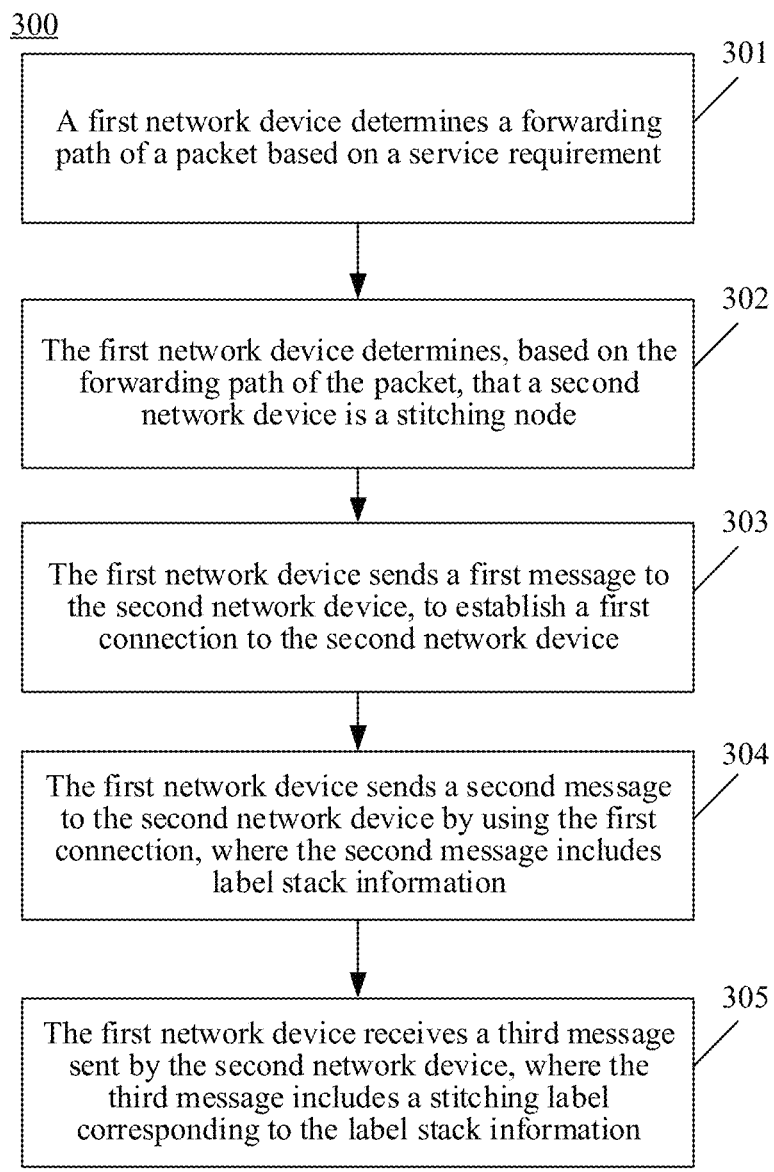
FIG. 3 is a schematic flowchart of a service processing method 300 according to an embodiment of this application.

FIG. 3 is a schematic flowchart of a service processing method 300 according to an embodiment of this application. As shown in FIG. 3, the service processing method 300 is a method in a scenario in which a stitching label is needed to indicate a forwarding path. The method includes the following steps.

Step 301: A first network device determines a forwarding path of a packet based on a service requirement.

In this embodiment, the first network device determines the forwarding path of the packet based on the obtained service requirement. For example, when the first network device is a controller, the first network device may compute, by using a network device that sends the service requirement to the first network device as a source device, a forwarding path from the source device to a destination device of the packet. When the first network device is a network device that participates in packet forwarding in a network, the first network device may compute, based on a received packet by using the first network device as a source device, a forwarding path from the first network device to a destination device of the packet.

Step 302: The first network device determines, based on the forwarding path of the packet, that a second network device is a stitching node, where the second network device is configured to allocate a stitching label.

It may be understood that, in a network, for example, an MPLS-TE network or an SR-MPLS network, in which a label indicates a forwarding path, a network device uses a plurality of labels carried in a label stack to indicate nodes or links on the forwarding path. Each label in the label stack may indicate a node or a link that the forwarding path passes through. However, a label stack depth supported by the network device is limited. For example, a quantity of labels that the label stack can carry is limited. For example, in some network devices, a maximum quantity of labels that the label stack can carry may be 10 layers, 18 layers, 28 layers, or the like.

In an example, when a quantity of the nodes or the links that the forwarding path determined by the network device passes through is greater than the maximum quantity of labels that the label stack can carry, the label stack indicating the forwarding path cannot completely carry all labels corresponding to the forwarding path. In this case, the stitching label may be for indicating packet forwarding.

In other words, the first network device may determine, based on the forwarding path of the packet, that a quantity of labels needed to indicate the forwarding path is greater than the maximum quantity of labels that a label stack can carry. Then, the first network device determines the second network device based on the forwarding path, where the second network device is a network device on the forwarding path of the packet, and the second network device may serve as the stitching node for allocating the stitching label.

There may be a plurality of manners in which the first network device determines the second network device based on the forwarding path. For example, after determining the forwarding path, the first network device may obtain a label stack 1 corresponding to the forwarding path. The first network device may use a maximum quantity of labels that a label stack on a forwarding plane can carry as a reference. In the label stack 1, N labels are counted in a direction from the bottom of the stack to the top of the stack, and a network device to which an Nth label belongs serves as the second network device. N is the maximum quantity of labels that the label stack can carry. For example, assuming that the maximum quantity of labels that the label stack on the forwarding plane of the first network device can carry is 10, the first network device may count 10 labels in the generated label stack 1 in the direction from the bottom of the stack to the top of the stack, and a network device to which the tenth label belongs serves as the second network device.

In addition, the first network device may alternatively use a maximum quantity of labels that a label stack on a forwarding plane can carry as a reference. In the label stack 1, N labels are counted in a direction from the top of the stack to the bottom of the stack, and a network device to which an Nth label belongs serves as the second network device. N is the maximum quantity of labels that the label stack can carry.

Alternatively, the first network device may determine the second network device in another manner. For example, the first network device determines that a network device at a midpoint between the destination device and a source network device is the second network device, provided that in the label stack generated by the first network device, both a quantity of labels from a label corresponding to the second network device to a top-of-stack label and a quantity of labels from the label corresponding to the second network device to a bottom-of-stack label are ensured to be not greater than a maximum quantity of labels that a forwarding plane can carry.

Step 303: The first network device sends a first message to the second network device, to establish a first connection to the second network device.

Step 303 is similar to step 203. For details, refer to the descriptions of step 203. Details are not described herein again.

Step 304: The first network device sends a second message to the second network device by using the first connection, where the second message includes label stack information, and the second message requests the second network device to allocate a stitching label corresponding to the label stack information.

In this embodiment, after the first network device establishes the first connection to the second network device, the first network device may send a request message to the second network device, to request the second network device to allocate the stitching label. The request message includes the label stack information, and the label stack information corresponds to the stitching label that the second network device is requested to allocate.

Step 305: The first network device receives a third message sent by the second network device, where the third message includes the stitching label corresponding to the label stack information.

In this embodiment, after the second network device receives the second message sent by the first network device, the second network device may dynamically apply for the stitching label from a label pool, and establish a correspondence between the stitching label and the label stack information, so that the second network device can replace the stitching label with the label stack information when receiving a packet carrying the stitching label. Then, the second network device may send the applied stitching label to the first network device by using the third message, so that the first network device can receive the third message including the stitching label corresponding to the label stack information.

Figure 4A:
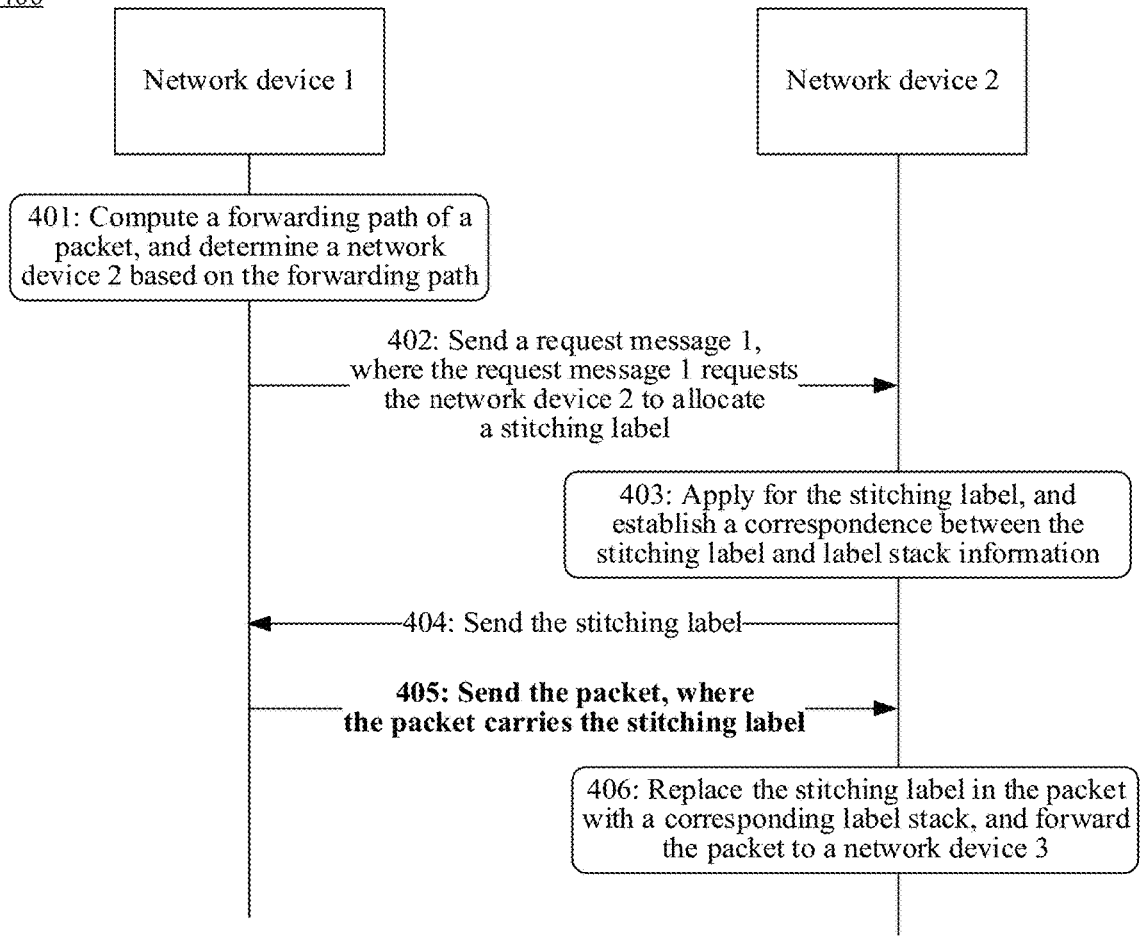
FIG. 4A is a schematic flowchart of a packet forwarding method 400 according to an embodiment of this application.
Figure 4B:
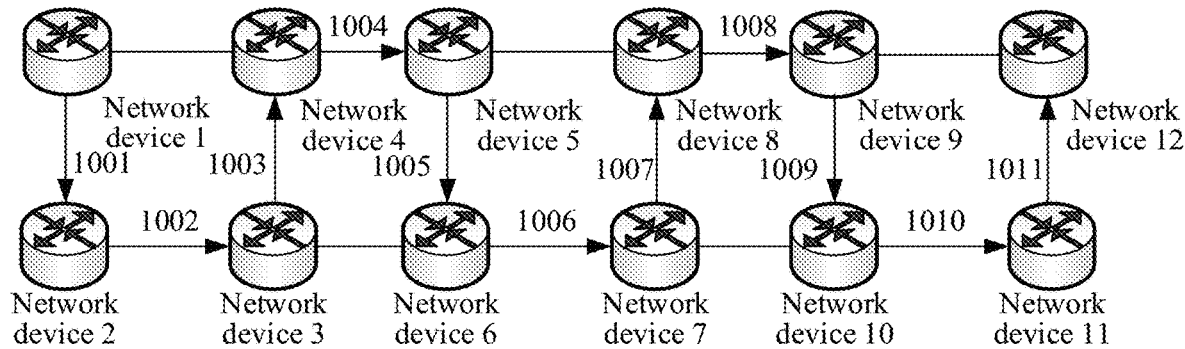
FIG. 4B is a schematic diagram of an architecture of an application network of the packet forwarding method 400 according to an embodiment of this application.

For example, FIG. 4A is a schematic flowchart of a packet forwarding method 400 according to an embodiment of this application, and FIG. 4B is a schematic diagram of an architecture of an application network of the packet forwarding method 400 according to an embodiment of this application. As shown in FIG. 4B, a first network device may be a network device 1 in FIG. 4B. The packet forwarding method 400 includes the following steps.

Step 401: The network device 1 computes a forwarding path of a packet, and determines a network device 2 based on the forwarding path.

When the first network device is the network device 1, the network device 1 may receive a packet from an external network. The network device 1 may compute, based on a destination address of the packet, that a path from the network device 1 to a network device 12 is "the network device 1—the network device 2—a network device 3—a network device 4—a network device 5—a network device 6—a network device 7—a network device 8—a network device 9—a network device 10—a network device 11—the network device 12".

Assume that a maximum quantity of labels that a label stack can carry is 10 layers. When the forwarding path obtained by the network device 1 through computation is the foregoing path, if a label in the label stack indicates a node on the forwarding path, labels that the label stack needs to carry include {the network device 2—the network device 3—the network device 4—the network device 5—the network device 6—the network device 7—the network device 8—the network device 9—the network device 10—the network device 11—the network device 12}, namely, 11 layers of labels in total. If a label in a label stack indicates a link on the forwarding path, labels that the label stack needs to carry include {1001-1002-1003-1004-1005-1006-1007-1008-1009-1010-1011}, namely, 11 layers of labels in total. In other words, a quantity of labels that need to be used in the label stack indicating the forwarding path is greater than the maximum quantity of labels that the label stack can actually carry. In an example, the network device 1 may determine a network device on the forwarding path as a stitching node, to request the network device to allocate a stitching label.

In this embodiment, the maximum quantity of labels that the label stack can carry is 10 layers. In an example, the network device 1 counts, in the foregoing label stack including 11 layers of labels, 10 labels in a direction from the bottom of the stack to the top of the stack, and uses a network device to which the tenth label (for example, the label 1002) belongs as the stitching node. Then, the network device 1 may determine, based on a TE database (TEDB), that the label 1002 is from the network device 2, to determine that the network device 2 is the stitching node.

In addition, the network device 1 may alternatively count, in the foregoing label stack including 11 layers of labels, 10 labels in a direction from the top of the stack to the bottom of the stack, and uses a network device to which the tenth label (for example, the label 1010) belongs as the stitching node. Then, the network device 1 may determine, based on a TEDB, that the label 1010 is from the network device 11, to determine that the network device 11 is the stitching node.

It may be understood that, the stitching node may alternatively be determined in another manner in addition to the foregoing manners. For example, the network device 1 determines any network device that is between the network device 1 and the network device 12 and that satisfies a condition as the stitching node. The condition is as follows. A label corresponding to the network device serving as the stitching node is ensured to be in the foregoing label stack including 11 layers of labels, and a quantity of labels from the label to a top-of-stack label and a quantity of labels from the label to a bottom-of-stack label are ensured not to be greater than 10 layers. For example, the network device 1 determines a network device such as the network device 5 or the network 6 as the stitching node.

Step 402: The network device 1 sends a request message 1 to the network device 2, where the request message 1 requests the network device 2 to allocate the stitching label.

It may be understood that, before the network device 1 sends the request message 1 to the network device 2, the network device 1 needs to serve as an initiator to actively establish a PCEP session connection to the network device 2. For a process in which the network device 1 establishes the PCEP session connection to the network device 2, refer to the descriptions in the foregoing embodiments. Details are not described herein again.

The request message 1 sent by the network device 1 to the network device 2 includes label stack information that is specified by the network device 1 and that needs to establish a correspondence with the stitching label. The label stack information may be, for example, 10 layers of labels counted from back to front by the network device 1 in the foregoing 11 layers of labels. For example, the label stack information may include {1002-1003-1004-1005-1006-1007-1008-1009-1010-1011}, namely, 10 layers of labels in total.

Step 403: The network device 2 applies for the stitching label, and establishes the correspondence between the stitching label and label stack information.

After the network device 2 receives the request message sent by the network device 1, the network device 2 may dynamically apply for the stitching label from a label pool, where the stitching label may be, for example, a stitching label 100. The network device 2 may further establish a correspondence between the stitching label 100 and the label stack information based on the label stack information in the request message. For example, the network device 2 may generate a forwarding entry. In the forwarding entry, the stitching label 100 corresponds to the label stack information {1002-1003-1004-1005-1006-1007-1008-1009-1010-1011}. When looking up the forwarding entry based on the stitching label 100, the network device 2 may find the corresponding 10-layer label stack information.

Step 404: The network device 2 sends the stitching label to the network device 1.

Step 405: The network device 1 sends a packet to the network device 2, where the packet carries the stitching label.

After the network device 1 receives the stitching label 100 sent by the network device 2, the network device 1 may replace the foregoing 10-layer label stack information with the stitching label 100. For example, the network device 1 generates a label stack {1001, 100}. In an example, when forwarding the packet, the network device 1 may forward the packet to the network device 2 based on an indication of the label stack {1001, 100}. In addition, before the network device 1 forwards the packet, the network device 1 removes the label 1001 from the label stack, so that a label stack of the packet forwarded by the network device 1 to the network device 2 includes only the stitching label 100.

Step 406: The network device 2 replaces the stitching label in the packet with the corresponding label stack, and forwards the packet to the network device 3.

After the network device 2 receives the packet forwarded by the network device 1, the network device 2 may determine, based on the forwarding entry, the 10-layer label stack information corresponding to the stitching label 100, to replace the stitching label 100 in the packet with the label stack {1002-1003-1004-1005-1006-1007-1008-1009-1010-1011}. Similarly, the network device 2 may determine, based on the label stack obtained through replacement, to forward the packet to the network device 3; and remove a top-of-stack label (for example, the label 1002) from the label stack before forwarding the packet, so that a label stack of the packet forwarded by the network device 2 to the network device 3 includes {1003-1004-1005-1006-1007-1008-1009-1010-1011} for guiding a subsequent network device to forward the packet.

The foregoing describes a packet forwarding process by using an example in which the first network device is the network device 1. In an actual case, the first network device may alternatively be a controller. The following describes in detail a packet forwarding process by using an example in which the first network device is the controller.

Figure 5A:
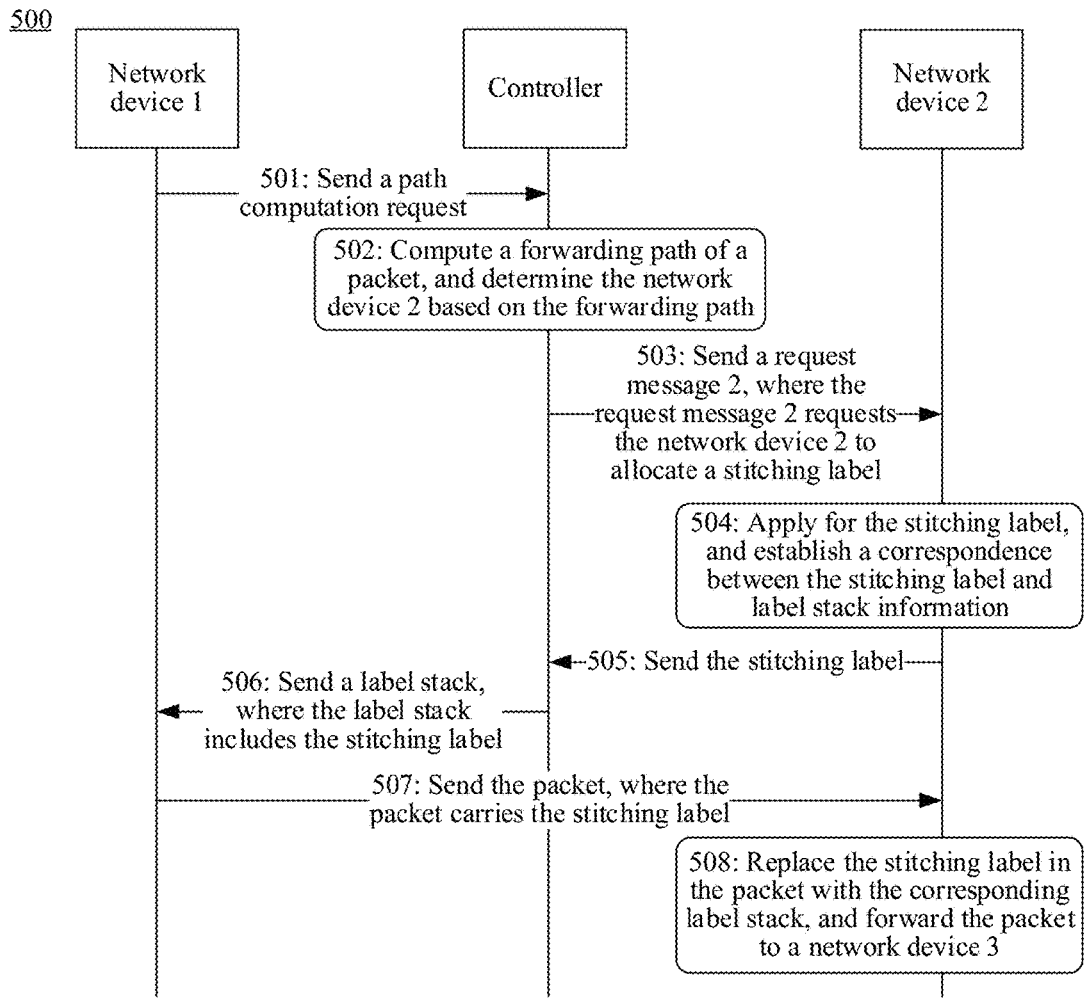
FIG. 5A is a schematic flowchart of a packet forwarding method 500 according to an embodiment of this application.
Figure 5B:
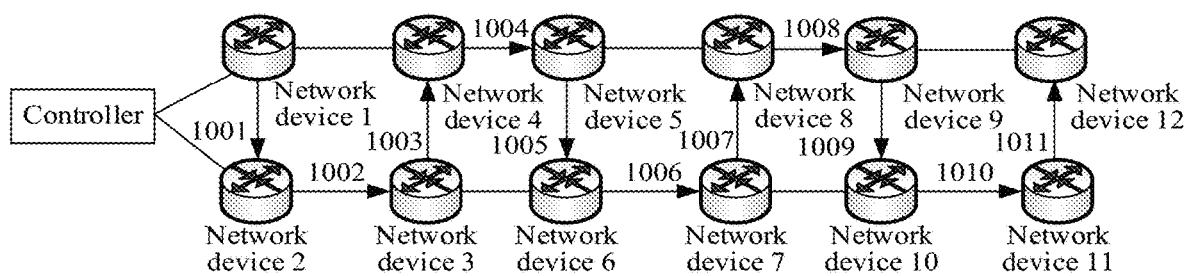
FIG. 5B is a schematic diagram of an architecture of an application network of the packet forwarding method 500 according to an embodiment of this application.

For example, FIG. 5A is a schematic flowchart of a packet forwarding method 500 according to an embodiment of this application, and FIG. 5B is a schematic diagram of an architecture of an application network of the packet forwarding method 500 according to an embodiment of this application. As shown in FIG. 5B, a first network device may be a controller in FIG. 5B. The packet forwarding method 500 includes the following steps.

Step 501: A network device 1 sends a path computation request to the controller.

When the network device 1 receives a packet that needs to be forwarded to a network device 12, the network device 1 sends the path computation request to the controller. The path computation request carries an address of the network device 12, to request the controller to compute a forwarding path from the network device 1 to the network device 12.

Step 502: The controller computes the forwarding path of the packet, and determines a network device 2 based on the forwarding path.

In this embodiment, step 502 is similar to step 401. For details, refer to step 401. Details are not described herein again.

Step 503: The controller sends a request message 2 to the network device 2, where the request message 2 requests the network device 2 to allocate a stitching label.

It may be understood that, before the controller sends the request message 2 to the network device 2, the controller needs to serve as an initiator to actively establish a PCEP session connection to the network device 2. For a process in which the controller establishes the PCEP session connection to the network device 2, refer to the descriptions in the foregoing embodiments. Details are not described herein again.

In this embodiment, step 503 is similar to step 402. For details, refer to step 402. Details are not described herein again.

Step 504: The network device 2 applies for the stitching label, and establishes a correspondence between the stitching label and label stack information.

Step 505: The network device 2 sends the stitching label to the controller.

In this embodiment, steps 504 and 505 are similar to steps 403 and 404. For details, refer to steps 403 and 404. Details are not described herein again.

Step 506: The controller sends a label stack to the network device 1, where the label stack includes the stitching label.

After the controller obtains the stitching label returned by the network device 2, the controller may generate, based on the stitching label, a label stack {1001, 100} indicating the forwarding path. For example, the label stack {1001, 100} carries a label indicating a link between the network device 1 and the network device 2, and the stitching label 100. Then, the controller sends the label stack to the network device 1, so that the network device may forward the packet based on the label stack.

Step 507: The network device 1 sends the packet to the network device 2, where the packet carries the stitching label.

Step 508: The network device 2 replaces the stitching label in the packet with the corresponding label stack, and forwards the packet to a network device 3.

In this embodiment, steps 507 and 508 are similar to steps 405 and 406. For details, refer to steps 405 and 406. Details are not described herein again.

The foregoing describes a process in which the first network device requests the second network device to allocate the stitching label in a scenario in which the stitching label is needed to indicate the forwarding path. The following describes a process in which the first network device requests the second network device to assist in computing the forwarding path in some other scenarios.

Figure 6:
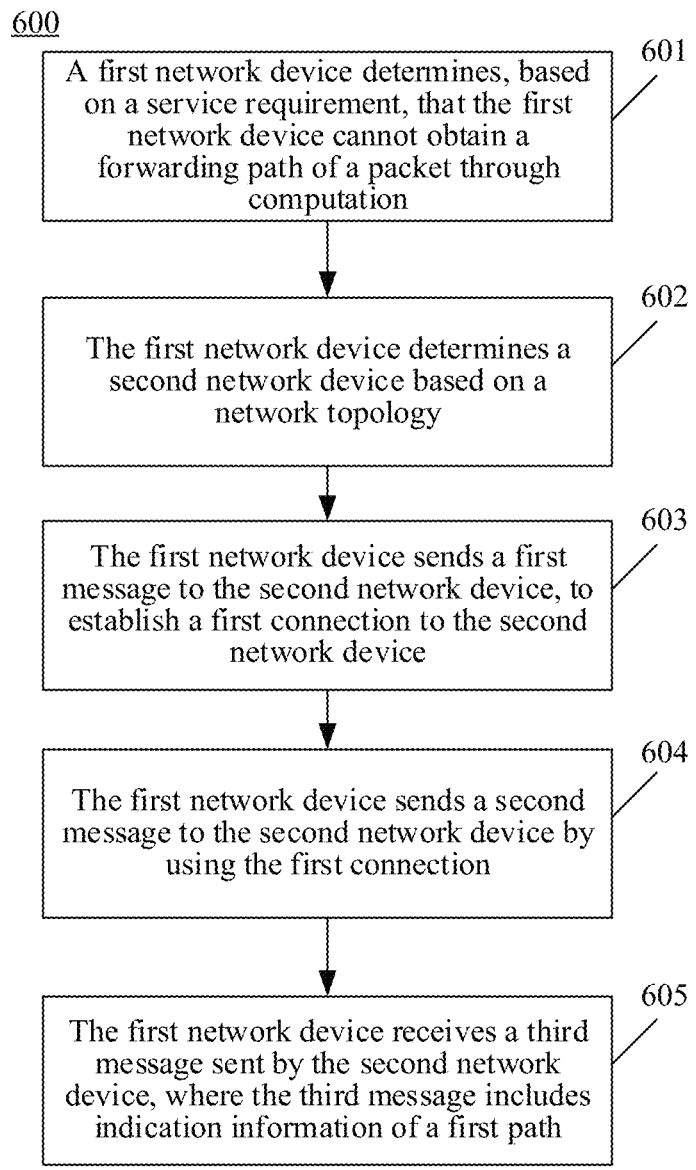
FIG. 6 is a schematic flowchart of a service processing method 600 according to an embodiment of this application.

FIG. 6 is a schematic flowchart of a service processing method 600 according to an embodiment of this application. As shown in FIG. 6, the service processing method 600 may be, for example, a method in a cross-area scenario. The method includes the following steps.

Step 601: A first network device determines, based on a service requirement, that the first network device cannot obtain a forwarding path of a packet through computation.

In this embodiment, the first network device may be a controller or a network device that participates in packet forwarding in a network. When the first network device is the controller, the first network device may obtain a request for computing the forwarding path of the packet. The service requirement may be computing a forwarding path to a destination device of the packet or a specified device. When the first network device is the network device that participates in packet forwarding in the network, the first network device may receive a to-be-forwarded packet. The service requirement may be forwarding the to-be-forwarded packet to a destination device or a specified device. In other words, the first network device needs to compute the forwarding path of the packet based on the service requirement.

The first network device may determine, based on the service requirement, that the first network device cannot independently obtain the forwarding path of the packet through computation. For example, when the first network device does not store a network topology related to the destination device of the packet, the first network device cannot obtain the forwarding path of the packet through computation. For another example, when the packet is subject to a specific forwarding constraint condition, for example, subject to a service level agreement (SLA) requirement, and the first network device cannot obtain an SLA corresponding to all or a part of links in the network topology, the first network device may also be incapable of obtaining the forwarding path of the packet through computation.

Step 602: The first network device determines a second network device based on the network topology, where the second network device is a network device on the forwarding path of the packet, and the second network device is configured to assist the first network device in computing a first path to the destination device.

In this embodiment, the first network device may store a global network topology or a local network topology between the first network device and the destination device of the packet. The first network device may determine, based on the global network topology or the local network topology, that the second network device is needed to assist the first network device in computing the first path to the destination device.

For example, when the first network device stores only the foregoing local network topology, the first network device cannot obtain a complete forwarding path to the destination device through computation. The first network device may determine a part of the forwarding path to the destination device. In addition, when determining that the second network device on the part of the forwarding path can obtain a remaining forwarding path through computation, the first network device may determine that the second network device is configured to assist the first network device in computing the remaining path to the destination device, namely, a forwarding path from the second network device to the destination device.

For another example, when the packet is subject to the specific forwarding constraint condition, for example, subject to the SLA requirement, and the first network device cannot obtain the SLA corresponding to all or the part of the links in the network topology, the first network device may determine that the second network device is needed to assist the first network device in computing the forwarding path to the destination device. The second network device may obtain the SLA corresponding to all or the part of the links in the network topology.

In a possible embodiment, the first network device may determine, based on the service requirement, that the destination device of the packet is not in a first area, where the first area is an area in which the first network device is located, and the first network device can obtain only a topology of the first area. The first network device determines the second network device based on the topology of the first area, where the second network device is boundary equipment of the first area and a second area; and the second area is an area in which the destination device is located, or the second area is an area that the forwarding path to the destination device needs to pass through.

In other words, when the packet needs to be forwarded across areas, the first network device may be incapable of obtaining a topology of another area. In an example, the first network device cannot obtain a complete forwarding path of the packet through computation. In this case, the first network device may determine, based on a topology of the area in which the first network device is located, that boundary equipment of the area is configured to assist the first network device in computing the path to the destination device. In addition to being located in the area in which the first network device is located, the boundary equipment may be located in the area in which the destination device is located, or may be located in the area that the forwarding path to the destination device needs to pass through. In this way, the boundary equipment may obtain the topology of the area other than the area in which the first network device is located, and obtain the forwarding path of the packet through computation.

In another possible application scenario, the first network device may alternatively need, for another reason, the second network device to help the first network device determine information related to the forwarding path.

Step 603: The first network device sends a first message to the second network device, to establish a first connection to the second network device.

Step 604: The first network device sends a second message to the second network device by using the first connection.

In this embodiment, the second message may request the second network device to compute the first path to the destination device. The second message may include, for example, addresses of two endpoint devices on the first path (for example, an address of the second network device and an address of the destination device of the packet).

Step 605: The first network device receives a third message sent by the second network device, where the third message includes indication information of the first path.

The indication information that is of the first path and that is returned by using the third message may indicate a complete path from the second network device to the destination device, or may indicate a part of the complete path.

In a possible implementation, after the second network device receives the second message sent by the first network device, the second network device may determine the first path to the destination device, and send the indication information corresponding to the first path to the first network device by using the third message. For example, when the second network device and the destination device of the packet are in a same area, the second network device may compute, based on a topology of the area, the path from the second network device to the destination device of the packet; use label stack information that is obtained through computation and that indicates the path as indication information of the path; and send the label stack information to the first network device by using the third message.

In another possible implementation, the second network device may alternatively determine a topology of an area that the packet needs to pass through, and send the topology of the area to the first network device by using the third message. For example, when the second network device and the destination device of the packet are in a same area, the second network device may determine that the packet needs to reach the destination device through the area. In an example, the second network device may use a topology of the area as indication information of a path, and send the indication information to the first network device by using the third message. In this way, the first network device may obtain the topology of the area in which the destination device is located, thereby obtaining, based on the topology of the area, the path to the destination device through computation.

In a possible embodiment, the first network device may alternatively determine a plurality of network devices that assist the first network device in computing the path to the destination device, and establish connections to the plurality of network devices, to request the plurality of network devices to assist in computing the path to the destination device.

For example, the packet forwarding method 600 may further include that the first network device determines a third network device based on the network topology, where the third network device is boundary equipment of the foregoing first area and the foregoing second area. For example, an area in which the third network device is located is the same as an area in which the second network device is located. The first network device establishes a second connection to the third network device, where the second connection may be, for example, a PCEP session connection. The first network device sends a fourth message to the third network device by using the second connection, where the fourth message requests the third network device to compute a second path to the destination device. The first network device receives a fifth message sent by the third network device, where the fifth message includes indication information of the second path. The first network device determines a part or all of the forwarding path of the packet based on the third message and the fifth message. For example, the first network device may select, according to a preset path selection policy, one of paths fed back by the second network device and the third network device, to determine the forwarding path of the packet.

In other words, when the first network device determines that both the second network device and the third network device are boundary equipment of the first area and the second area, the first network device may establish PCEP session connections to the second network device and the third network device, to request the second network device and the third network device to compute the path to the destination device. After the first network device obtains path indication information returned by the second network device and the third network device, the first network device determines the forwarding path of the packet by integrating the path indication information returned by the two network devices.

Figure 7A:
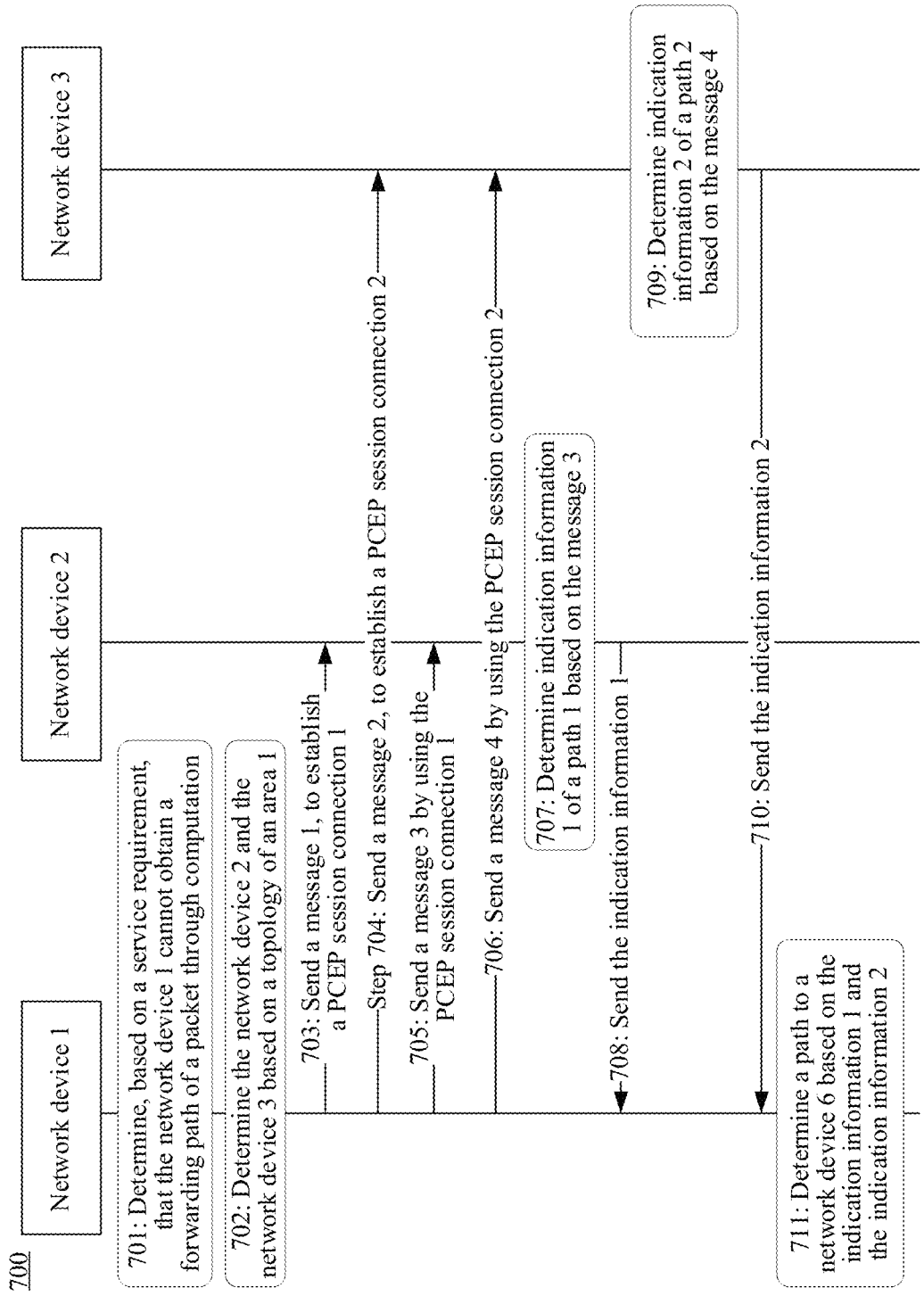
FIG. 7A is a schematic flowchart of a method 700 for determining a forwarding path of a packet according to an embodiment of this application.
Figure 7B:
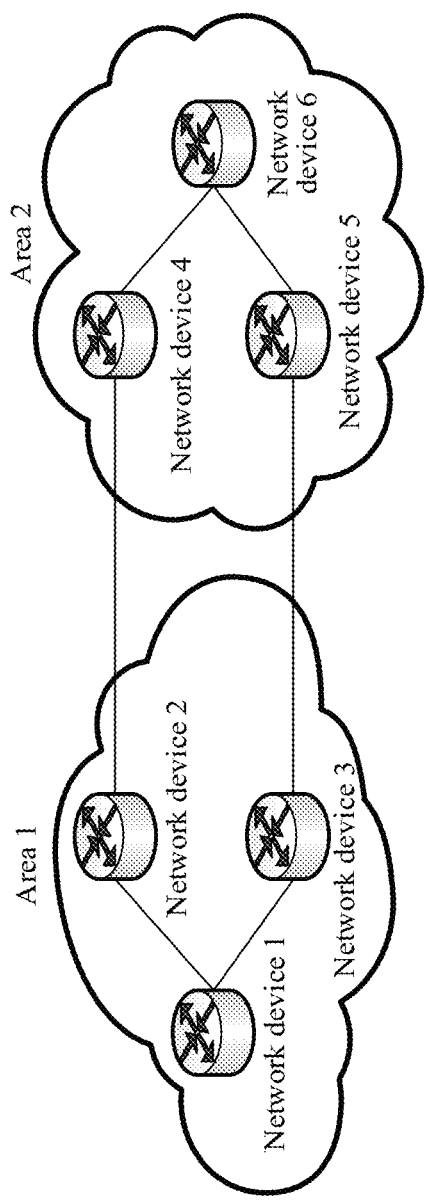
FIG. 7B is a schematic diagram of an architecture of an application network of the method 700 for determining a forwarding path of a packet according to an embodiment of this application.

For ease of understanding, the following describes in detail, with reference to a specific example, a process of determining a forwarding path of a packet in a cross-area scenario. FIG. 7A is a schematic flowchart of a method 700 for determining a forwarding path of a packet according to an embodiment of this application, and FIG. 7B is a schematic diagram of an architecture of an application network of the method 700 for determining a forwarding path of a packet according to an embodiment of this application. As shown in FIG. 7B, a network device 1, a network device 2, and a network device 3 are in an area 1, and the network device 2 and the network device 3 are also in an area 2. A network device 4, a network device 5, and a network device 6 are in the area 2.

The method 700 for determining a forwarding path of a packet includes the following steps.

Step 701: The network device 1 determines, based on a service requirement, that the network device 1 cannot obtain a forwarding path of a packet through computation.

The service requirement may be forwarding the packet to the network device 6. The network device 6 is in the area 2, but the network device 1 is in the area 1 and the network device 1 does not have a topology of the area 2. In an example, the network device 1 may determine that the network device 1 cannot obtain a path to the network device 6 through computation. The network device 6 may be a destination device of the packet; or may not be a destination device of the packet, but is connected to the destination device.

Step 702: The network device 1 determines the network device 2 and the network device 3 based on a topology of the area 1.

The network device 1 may determine, based on the topology of the area 1, that the network device 2 and the network device 3 are boundary equipment of the area 1, and that the network device 2 and the network device 3 may have the topology of the area 2. In an example, the network device 1 may determine that the network device 2 and the network device 3 assist the network device 1 in computing the forwarding path of the packet.

Step 703: The network device 1 sends a message 1 to the network device 2, to establish a PCEP session connection 1 to the network device 2.

Step 704: The network device 1 sends a message 2 to the network device 3, to establish a PCEP session connection 2 to the network device 3.

For process in which the network device 1 establishes the PCEP session connections to the network device 2 and the network device 3, refer to the foregoing embodiments. Details are not described herein again.

Step 705: The network device 1 sends a message 3 to the network device 2 by using the PCEP session connection 1, where the message 3 requests the network device 2 to compute a path 1 to the network device 6.

The path 1 to the network device 6 may be a path from the network device 2 to the network device 6.

Step 706: The network device 1 sends a message 4 to the network device 3 by using the PCEP session connection 2, where the message 4 requests the network device 3 to compute a path 2 to the network device 6.

The path 2 to the network device 6 may be a path from the network device 3 to the network device 6.

Step 707: The network device 2 determines indication information 1 of the path 1 based on the message 3.

The network device 2 is boundary equipment of the area 2, and the network device 2 may obtain the topology of the area 2. In an example, the network device 2 may determine, based on the topology of the area 2, the path 1 from the network device 2 to the network device 6. In this way, the network device 2 may determine the indication information 1 based on the path 1 from the network device 2 to the network device 6. The indication information 1 may include, for example, label stack information indicating the path 1.

Step 708: The network device 2 sends the indication information 1 to the network device 1.

Step 709: The network device 3 determines indication information 2 of the path 2 based on the message 4.

Similarly, the network device 3 is boundary equipment of the area 2. In an example, the network device 3 may also obtain the topology of the area 2, and can determine, based on the topology of the area 2, the path 2 from the network device 3 to the network device 6. In this way, the network device 3 may determine the indication information 2 based on the path 2 from the network device 3 to the network device 6. The indication information 2 may include, for example, label stack information indicating the path 2.

Step 710: The network device 3 sends the indication information 2 to the network device 1.

Step 711: The network device 1 determines the path to the network device 6 based on the indication information 1 and the indication information 2.

After receiving the indication information 1 corresponding to the path 1 and the indication information 2 corresponding to the path 2, the network device 1 may obtain the path 1 from the network device 2 to the network device 6 and the path 2 from the network device 3 to the network device 6. The network device 1 may select a path from the path 1 and the path 2 based on a preset path selection policy, to determine the path to the network device 6. For example, if the network device 1 selects the path 1 from the path 1 and the path 2, the network device may generate a path from the network device 1 to the network device 2 and then from the network device 2 to the network device 6.

The foregoing describes a process of determining the forwarding path of the packet in a scenario in which the forwarding path of the packet crosses one area. The following describes in detail, with reference to a specific example, a process of determining the forwarding path of the packet in a scenario in which the forwarding path of the packet crosses a plurality of areas.

Figure 8A:
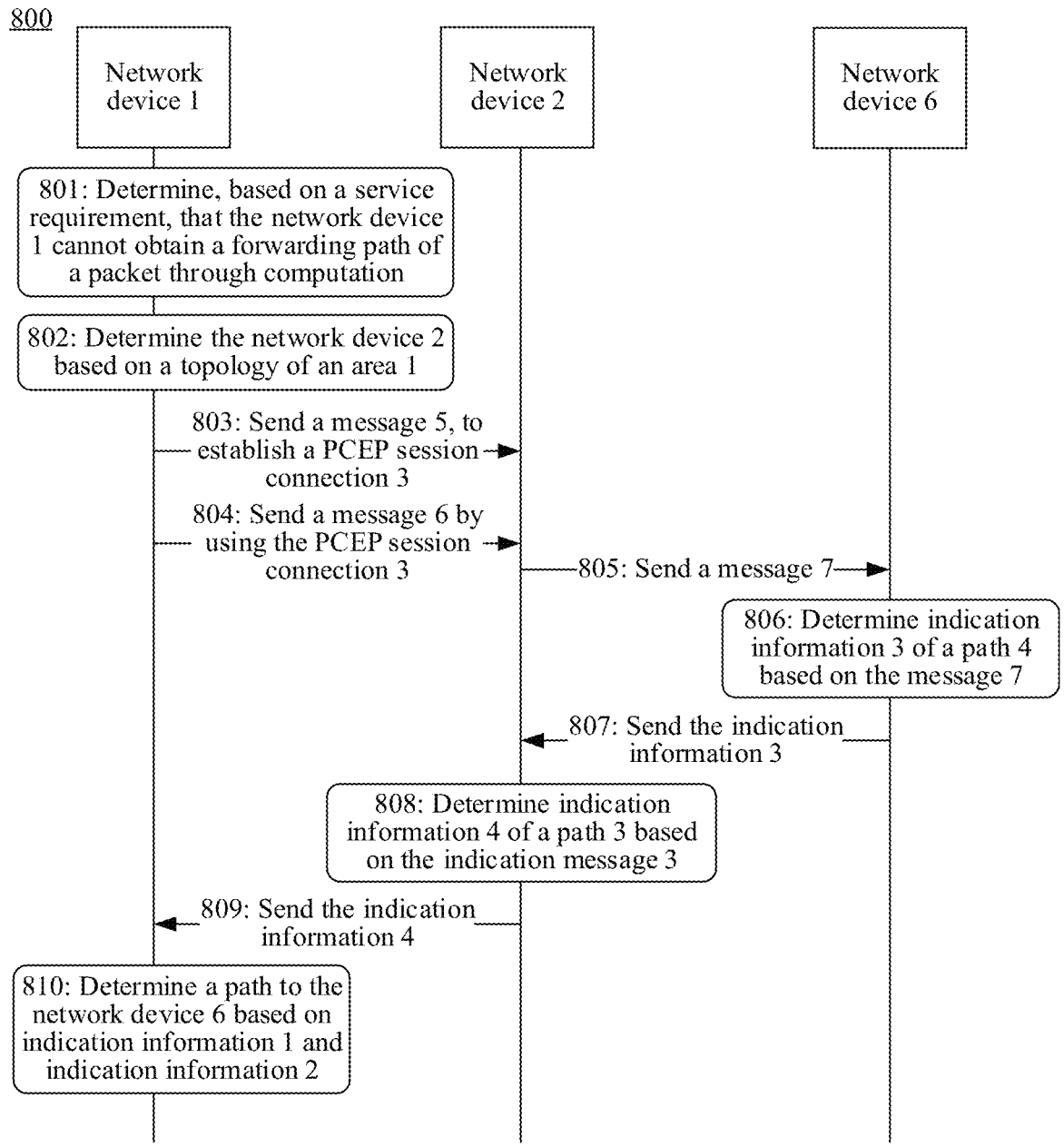
FIG. 8A is a schematic flowchart of a method 800 for determining a forwarding path of a packet according to an embodiment of this application.
Figure 8B:
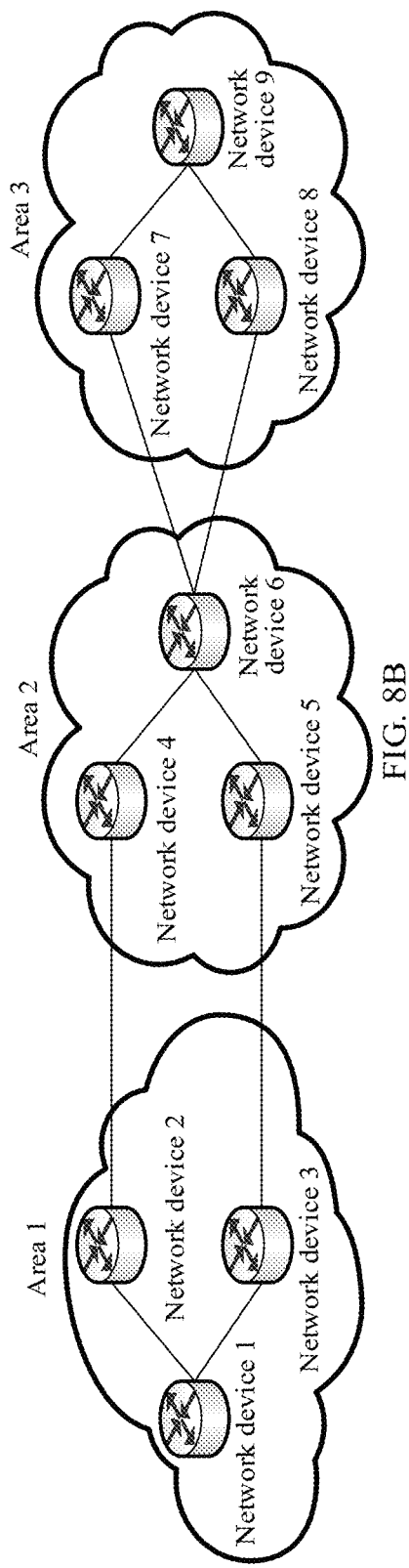
FIG. 8B is a schematic diagram of an architecture of an application network of the method 800 for determining a forwarding path of a packet according to an embodiment of this application.

FIG. 8A is a schematic flowchart of a method 800 for determining a forwarding path of a packet according to an embodiment of this application, and FIG. 8B is a schematic diagram of an architecture of an application network of the method 800 for determining a forwarding path of a packet according to an embodiment of this application.

As shown in FIG. 8B, a network device 1, a network device 2, and a network device 3 are in an area 1; the network device 2, the network device 3, a network device 4, a network device 5, and a network device 6 are in an area 2; and the network device 6, a network device 7, a network device 8, and a network device 9 are in an area 3.

The method 800 for determining a forwarding path of a packet includes the following steps.

Step 801: The network device 1 determines, based on a service requirement, that the network device 1 cannot obtain a forwarding path of a packet through computation.

The service requirement may be forwarding the packet to the network device 9. The network device 9 is in the area 3, but the network device 1 is in the area 1 and the network device 1 does not have a topology of the area 3. In an example, the network device 1 may determine that the network device 1 cannot obtain a path to the network device 9 through computation.

Step 802: The network device 1 determines the network device 2 based on a topology of the area 1.

The network device 1 may determine, based on the topology of the area 1, that the network device 2 is boundary equipment of the area 1, and that the network device 2 may have the topology of the area 3. In an example, the network device 1 may determine that the network device 2 assists the network device 1 in computing the forwarding path of the packet.

Step 803: The network device 1 sends a message 5 to the network device 2, to establish a PCEP session connection 3 to the network device 2.

Step 804: The network device 1 sends a message 6 to the network device 2 by using the PCEP session connection 3, where the message 6 requests the network device 2 to compute a path 3 to the network device 9.

The path 3 to the network device 9 may be a path from the network device 2 to the network device 9.

Step 805: The network device 2 sends a message 7 to the network device 6, where the message 7 requests the network device 6 to compute a path 4 to the network device 9.

The network device 9 is in the area 3, and the network device 2 does not have the topology of the area 3. In an example, the network device 2 may determine that the network device 2 cannot obtain the path to the network device 9 through computation. In this case, the network device 2 may determine, based on a topology of the area 2, that the network device 6 is boundary equipment of the area 2. For example, the network device 6 may have the topology of the area 3. In an example, the network device 2 may determine that the network device 6 assists the network device 2 in computing the forwarding path of the packet, to send the message 7 to the network device 6. The message 7 requests the network device 6 to compute the path 4 to the network device 9, and the path 4 may be a path from the network device 6 to the network device 9.

Step 806: The network device 6 determines, based on the message 7, indication information 3 corresponding to the path 4.

The network device 6 is boundary equipment of the area 3, and the network device 6 may obtain the topology of the area 3. In an example, the network device 6 may determine, based on the topology of the area 3, the path 4 from the network device 6 to the network device 9. In this way, the network device 6 may determine the indication information 3 based on the path 4 from the network device 6 to the network device 9. The indication information 3 may include, for example, label stack information indicating the path 4.

Step 807: The network device 6 sends the indication information 3 corresponding to the path 4 to the network device 2.

It may be understood that the network device 6 may send the indication information 3 corresponding to the path 4 to the network device 2, or the network device 6 may directly send the indication information 3 to the network device 1. This is not limited in this embodiment.

Step 808: The network device 2 determines, based on the indication message 3, indication information 4 corresponding to the path 3.

After the network device obtains the indication information 3, the network device 2 may obtain the path 3 from the network device 2 to the network device 9 based on a path from the network device 2 to the network device 6 and the path that is from the network device 6 to the network device 9 and that is indicated by the indication information 3, to determine the indication information 4 corresponding to the path.

Step 809: Send the indication information 4 corresponding to the path 3 to the network device 1.

Step 810: The network device 1 determines the path to the network device 9 based on the indication information 4.

Similarly, after the network device 1 obtains the indication information 4, the network device 1 may determine the path from the network device 1 to the network device 9 based on a path from the network device 1 to the network device 2 and the path 3 indicated by the indication information 4.

The foregoing embodiments are used as examples to describe the scenarios to which the service processing methods provided in embodiments of this application are applied. It may be understood that the service processing methods provided in embodiments of this application may be further applied to a network scenario in which a controller and a forwarder are deployed. A type of the controller that is deployed in the network and to which embodiments of this application are applied is not uniquely limited herein.

Figure 9:
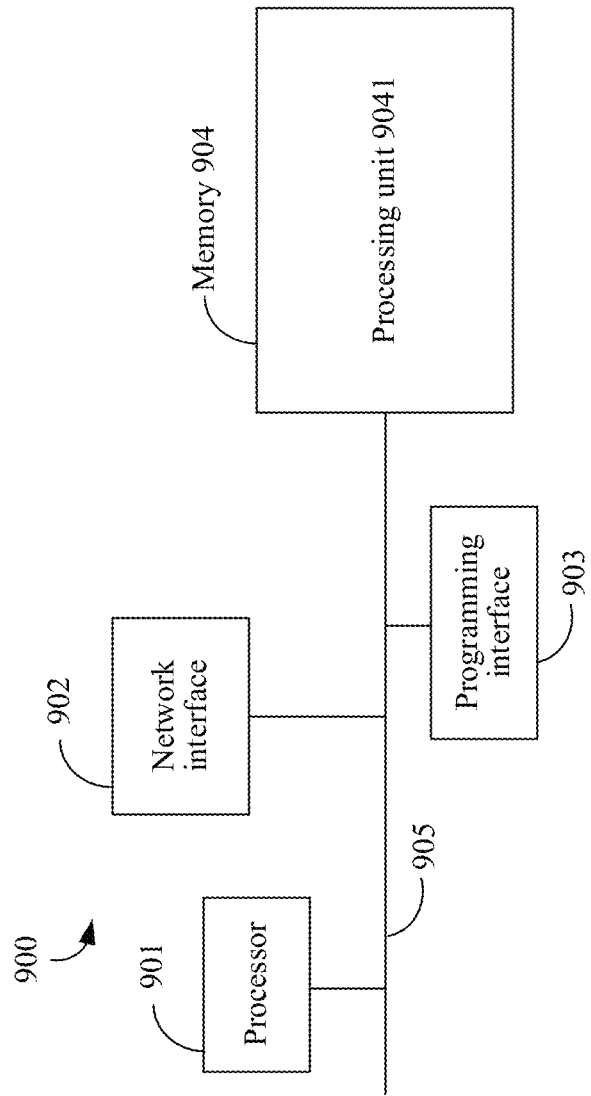
FIG. 9 is a schematic diagram of a structure of a network device 900 according to an embodiment of this application.

To implement the foregoing embodiments, this application further provides a network device. FIG. 9 is a schematic diagram of a structure of a network device 900 according to an embodiment of this application.

Although the network device 900 shown in FIG. 9 shows some specific features, a person skilled in the art may be aware from embodiments of this application that, for brevity, FIG. 9 does not show various other features, to avoid confusing more related aspects of the implementations disclosed in embodiments of this application. For this purpose, in an example, in some implementations, the network device 900 includes one or more processors 901, a network interface 902, a programming interface 903, a memory 904, and one or more communication buses 905 that are configured to interconnect various components. In some other implementations, some functional components or units may be omitted from or added to the network device 900 based on the foregoing example.

In some implementations, in addition to another purpose, the network interface 902 is configured to connect to one or more other network devices/servers in a network system. In some implementations, the communication bus 909 includes a circuit that interconnects system components and controls communication between the system components. The memory 904 may include a non-volatile memory, for example, a read-only memory (ROM), a programmable ROM (PROM), an erasable PROM (EPROM), an electrically EPROM (EEPROM), or a flash memory. The memory 904 may alternatively include a volatile memory. The volatile memory may be a random-access memory (RAM), and is used as an external cache.

In some implementations, the memory 904 or a non-transitory computer-readable storage medium of the memory 904 stores the following programs, modules, and data structures, or a subset thereof, and includes a transceiver unit (not shown in the figure) and a processing unit 9041.

In a possible embodiment, the network device 900 may be, for example, the first network device in the foregoing embodiments. The network device 900 may include, for example, the transceiver unit and the processing unit 9041.

In a possible embodiment, the network device 900 may have any function of the first network device in the method 200 or the first network device in the method 300. The network device 900 may include, for example, the transceiver unit and the processing unit 9041. The transceiver unit is configured to perform step 202, step 203, step 204, step 303, step 304, or step 305. The processing unit 9041 is configured to perform step 201, step 301, or step 302.

It may be understood that the function of the transceiver unit may be implemented by the processor invoking program code in the memory, and cooperation with the network interface 902 is performed when necessary. Alternatively, a data receiving/sending operation may be completed through the network interface 902 on the network device 900.

In various implementations, the network device 900 is configured to perform the service processing methods provided in embodiments of this application, for example, perform the service processing methods corresponding to the embodiments shown in FIG. 2 to FIG. 8B.

In correspondence to the method embodiments and the virtual apparatus embodiment provided in this application, embodiments of this application further provide a network device. The following describes a hardware structure of the network device.

Figure 10:
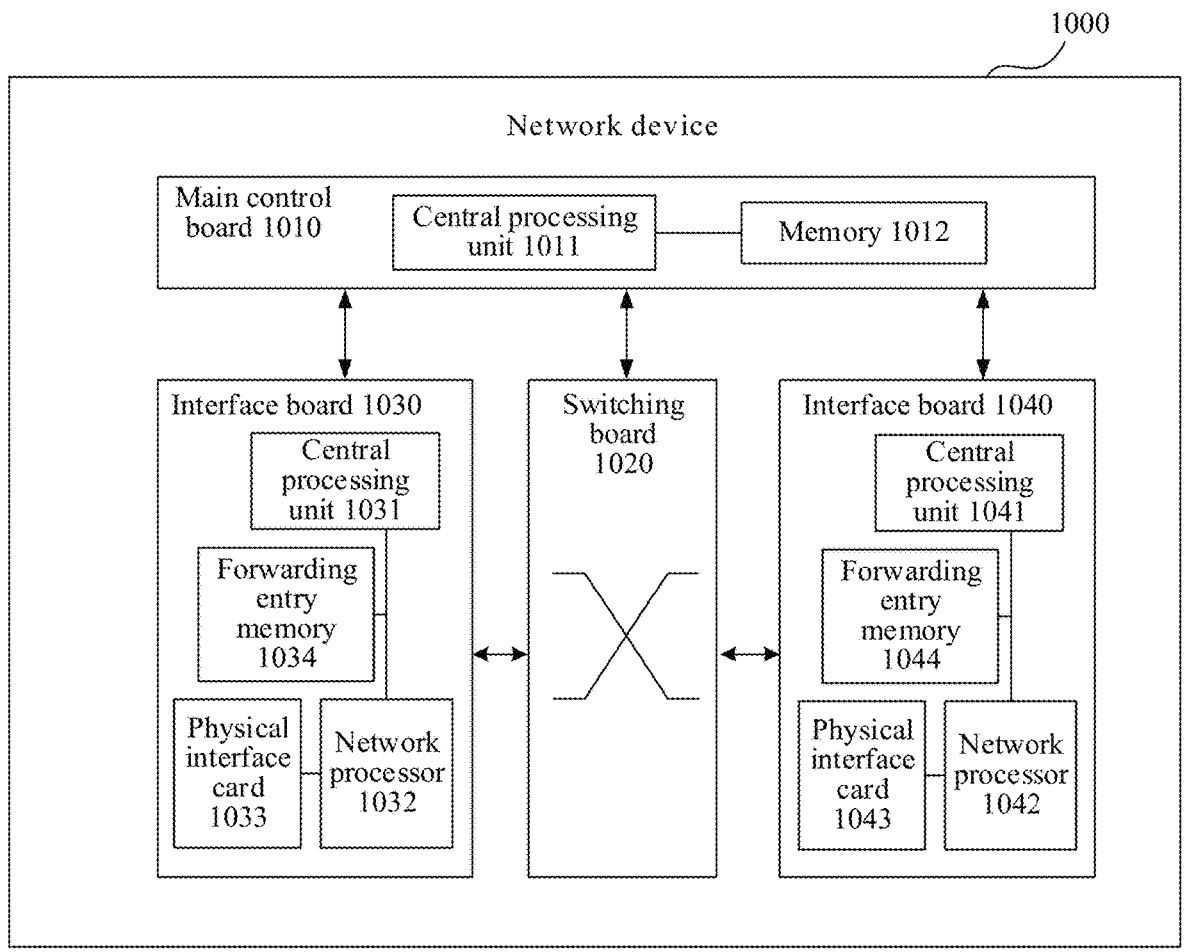
FIG. 10 is a schematic diagram of a structure of a network device 1000 according to an embodiment of this application.

FIG. 10 is a schematic diagram of a structure of a network device 1000 according to an embodiment of this application. The network device 1000 may be configured as the first network device in the foregoing method embodiments.

The network device 1000 corresponds to the first network device in the foregoing method embodiments. Hardware and modules in the network device 1000 and the foregoing other operations and/or functions are respectively intended to implement various steps and methods implemented by the first network device in the method embodiments. For specific details of a detailed procedure about how the network device 1000 forwards a packet, refer to the foregoing method embodiments. For brevity, details are not described herein again. The steps of the foregoing method 200 or method 300 are completed through an integrated logic circuit of hardware in a processor of the network device 1000 or by using instructions in a form of software. The steps of the methods disclosed with reference to embodiments of this application may be directly performed by a hardware processor, or may be performed by a combination of hardware in the processor and a software module. The software module may be in a mature storage medium in the art, such as a random access memory, a flash memory, a read-only memory, a programmable read-only memory, an electrically erasable programmable memory, or a register. The storage medium is in the memory. The processor reads information in the memory and completes the steps in the foregoing methods in combination with the hardware of the processor. To avoid repetition, details are not described herein again.

The network device 1000 corresponds to the network device 900 in the foregoing virtual apparatus embodiment, and each functional module in the network device 900 is implemented by using software of the network device 1000. In other words, the functional modules included in the network device 900 are generated after the processor of the network device 1000 reads program code stored in the memory.

The network device 1000 includes a main control board 1010 and an interface board 1030.

The main control board 1010 is also referred to as a main processing unit (MPU) or a route processor card (route processor card). The main control board 1010 controls and manages components in the network device 1000, and has functions such as routing computation, device management, device maintenance, and protocol processing. The main control board 1010 includes a central processing unit (CPU) 1011 and a memory 1012.

The interface board 1030 is also referred to as a line processing unit (LPU) card, a line card (line card), or a service board. The interface board 1030 is configured to provide various service interfaces and forward a data packet. The service interfaces include but are not limited to an Ethernet interface, a Packet over Synchronous Optical Network/Synchronous Digital Hierarchy POS/SDH interface, and the like. The Ethernet interface is, for example, a Flexible Ethernet (FlexE) service interface. The interface board 1030 includes a CPU 1031, a network processor 1032, a forwarding entry memory 1034, and a physical interface card (physical interface card, PIC) 1033.

The CPU 1031 on the interface board 1030 is configured to control and manage the interface board 1030, and communicate with the CPU 1011 on the main control board 1010.

The network processor 1032 is configured to forward a packet. A form of the network processor 1032 may be a forwarding chip. In an example, processing on an uplink packet includes processing on a packet ingress interface and forwarding table lookup; and processing on a downlink packet includes forwarding table lookup and the like.

The physical interface card 1033 is configured to implement a physical layer interconnection function. Original traffic enters the interface board 1030 from the physical interface card 1033, and a processed packet is sent out from the physical interface card 1033. The physical interface card 1033 includes at least one physical interface, and the physical interface is also referred to as a physical interface. The physical interface card 1033 corresponds to a FlexE physical interface 204 in a system architecture 200. The physical interface card 1033, also referred to as a subcard, may be mounted on the interface board 1030, and is responsible for converting a photoelectric signal into a packet, performing validity check on the packet, and forwarding the packet to the network processor 1032 for processing. In some embodiments, the CPU 1031 on the interface board 1003 may also perform a function of the network processor 1032, for example, implement software forwarding based on a general-purpose CPU, so that the physical interface card 1033 does not need the network processor 1032.

Optionally, the network device 1000 includes a plurality of interface boards. For example, the network device 1000 further includes an interface board 1040, and the interface board 1040 includes a CPU 1041, a network processor 1042, a forwarding entry memory 1044, and a physical interface card 1043.

Optionally, the network device 1000 further includes a switching board 1020. The switching board 1020 may also be referred to as a switch fabric unit (switch fabric unit, SFU). When the network device includes a plurality of interface boards 1030, the switching board 1020 is configured to complete data exchange between the interface boards. For example, the interface board 1030 and the interface board 1040 may communicate with each other via the switching board 1020.

The main control board 1010 is coupled to the interface board 1030. For example, the main control board 1010, the interface board 1030, the interface board 1040, and the switching board 1020 are connected to a system backplane through a system bus to communicate with each other. In a possible implementation, an inter-process communication (IPC) channel is established between the main control board 1010 and the interface board 1030, and the main control board 1010 communicates with the interface board 1030 through the IPC channel.

Logically, the network device 1000 includes a control plane and a forwarding plane. The control plane includes the main control board 1010 and the CPU 1031. The forwarding plane includes components that perform forwarding, such as the forwarding entry memory 1034, the physical interface card 1033, and the network processor 1032. The control plane performs functions such as a function of a router, generating a forwarding table, processing signaling and a protocol packet, and configuring and maintaining a status of a device. The control plane delivers the generated forwarding table to the forwarding plane. On the forwarding plane, based on the forwarding table delivered by the control plane, the network processor 1032 looks up the table, and forwards a packet received by the physical interface card 1033. The forwarding table delivered by the control plane may be stored in the forwarding entry memory 1034. In some embodiments, the control plane and the forwarding plane may be completely separated, and are not on a same device.

If the network device 1000 is configured as the first network device in the method 200, the CPU 1011 obtains a packet; and adds first indication information and second indication information to the packet, to obtain an updated packet. The network processor 1032 triggers the physical interface card 1033 to send the updated packet to a second network device.

If the network device 1000 is configured as the first network device in the method 300, the CPU 1011 determines a second network device on a forwarding path of a packet based on a service requirement. The network processor 1032 triggers the physical interface card 1033 to send a first message and a second message to the second network device.

It should be understood that the transceiver unit in the network device 900 is equivalent to the physical interface card 1033 or the physical interface card 1043 in the network device 1000, and the obtaining module 901 and the processing unit 902 in the network device 900 may be equivalent to the CPU 1011 or the CPU 1031 in the network device 1000.

It should be understood that an operation on the interface board 1040 is consistent with an operation on the interface board 1030 in this embodiment of this application. For brevity, details are not described again. It should be understood that the network device 1000 in this embodiment may correspond to the first network device or the second network device in the foregoing method embodiments. The main control board 1010, and the interface board 1030 and/or the interface board 1040 in the network device 1000 may implement functions of and/or various steps implemented by the first network device or the second network device in the foregoing method embodiments. For brevity, details are not described herein again.

It should be noted that, there may be one or more main control boards. When there are a plurality of main control boards, the main control boards may include an active main control board and a standby main control board. There may be one or more interface boards. A network device having a stronger data processing capability provides more interface boards. There may also be one or more physical interface cards on the interface board. There may be no switching board or one or more switching boards. When there is a plurality of switching boards, load balancing and redundancy backup may be implemented together. In a centralized forwarding architecture, the network device may not need the switching board, and the interface board provides a function of processing service data in an entire system. In a distributed forwarding architecture, the network device may have at least one switching board, and data exchange between a plurality of interface boards is implemented via the switching board, to provide a large-capacity data exchange and processing capability. In an example, a data access and processing capability of the network device in the distributed architecture is better than that of the device in the centralized architecture. Optionally, the network device may alternatively be in a form in which there is only one card. In an example, there is no switching board, and functions of the interface board and the main control board are integrated on the card. In this case, the CPU on the interface board and the CPU on the main control board may be combined into one CPU on the card, to perform functions obtained by combining the two CPU. The device in this form (for example, a network device such as a low-end switch or router) has a weak data exchange and processing capability. A specific architecture that is to be used depends on a specific networking deployment scenario. This is not limited herein.

In some possible embodiments, the first network device or the second network device may be implemented as a virtualized device. For example, the virtualized device may be a virtual machine (VM) on which a program having a packet sending function is run, and the virtual machine is deployed on a hardware device (for example, a physical server). The virtual machine is a complete software-simulated computer system that has all hardware system functions and that runs in an entirely isolated environment. The virtual machine may be configured as the first network device or the second network device. For example, the first network device or the second network device may be implemented based on a general-purpose physical server in combination with a network functions virtualization (NFV) technology. The first network device or the second network device is a virtual host, a virtual router, or a virtual switch. After reading this application, with reference to the NFV technology, a person skilled in the art may virtualize, on the general-purpose physical server, the first network device or the second network device having the foregoing functions. Details are not described herein again.

It should be understood that the network devices in the foregoing product forms separately have any function of the first network device or the second network device in the foregoing method embodiments. Details are not described herein again.

An embodiment of this application provides a computer program product. When the computer program product runs on a network device, the network device is enabled to perform the method performed by the first network device in the method 200 or the method 300.

Figure 11:
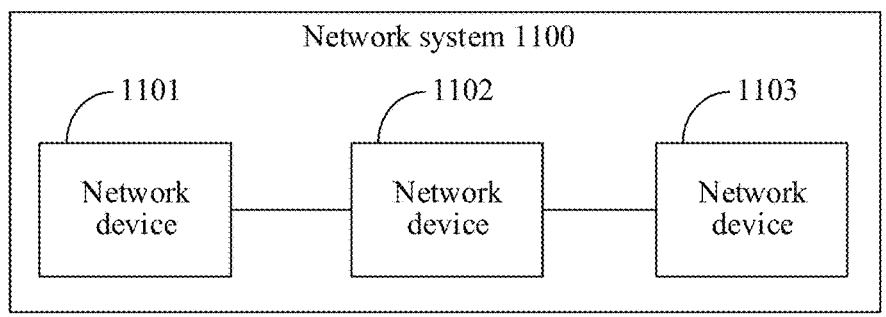
FIG. 11 is a schematic diagram of a structure of a network system 1100 according to an embodiment of this application.

Referring to FIG. 11, an embodiment of this application provides a network system 1100. The system 1100 includes a network device 1101 and a network device 1102. Optionally, the network device 1101 may be the first network device in the method 200, the network device 900, or the network device 1000, and the network device 1101 is a head-end node in a network. The network device 1102 may be the first network device in the method 300, the network device 900, or the network device 1000, and the network device 1102 is a transit node in the network. Optionally, the system 1100 may further include a network device 1103. The network device 1103 may be the network device 900 or the network device 1000, and the network device 1103 is an egress node in the network.

An embodiment of this application further provides a chip, including a processor and an interface circuit. The interface circuit is configured to receive instructions and transmit the instructions to the processor. The processor is coupled to a memory. The memory is configured to store a program or instructions. When the program or the instructions are executed by the processor, a chip system is enabled to implement the method in any one of the foregoing method embodiments.

Optionally, there may be one or more processors in the chip system. The processor may be implemented by using hardware, or may be implemented by using software. When the processor is implemented by using the hardware, the processor may be a logic circuit, an integrated circuit, or the like. When the processor is implemented by using the software, the processor may be a general-purpose processor, and is implemented by reading software code stored in the memory.

Optionally, there may also be one or more memories in the chip system. The memory may be integrated with the processor, or may be disposed separately from the processor. This is not limited in this application. For example, the memory may be a non-transitory processor, for example, a read-only memory ROM. The memory and the processor may be integrated onto a same chip, or may be separately disposed on different chips. A type of the memory and a manner of disposing the memory and the processor are not limited in this application.

For example, the chip system may be a field-programmable gate array (FPGA), an application-specific integrated chip (ASIC), a system on chip (SoC), a CPU, a network processor (NP), a digital signal processing circuit (DSP), a micro controller unit (MCU), a programmable controller (PLD), or another integrated chip.

The foregoing describes embodiments of this application in detail. Steps in the methods in embodiments of this application may be sequentially scheduled, combined, or deleted according to an actual requirement. Modules in the apparatus in embodiments of this application may be divided, combined, or deleted according to an actual requirement.

It should be understood that "one embodiment" or "an embodiment" mentioned in the entire specification means that particular features, structures, or characteristics related to the embodiment are included in at least one embodiment of this application. In an example, "in one embodiment" or "in an embodiment" appearing throughout the specification does not necessarily refer to a same embodiment. In addition, these particular features, structures, or characteristics may be combined in one or more embodiments in any appropriate manner. It should be understood that sequence numbers of the foregoing processes do not mean execution sequences in various embodiments of this application. The execution sequences of the processes should be determined based on functions and internal logic of the processes, and should not be construed as any limitation on the implementation processes of embodiments of this application.

The term "and/or" in this specification is only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in embodiments of this application, "B corresponding to A" indicates that B is associated with A, and B may be determined based on A. However, it should be further understood that determining B based on A does not mean that B is determined based only on A. B may alternatively be determined based on A and/or other information.

A person of ordinary skill in the art may be aware that, in combination with the examples described in embodiments disclosed in this specification, units and algorithm steps can be implemented by using electronic hardware, computer software, or a combination thereof. To clearly describe the interchangeability between the hardware and the software, the foregoing has generally described compositions and steps of each example according to functions. Whether the functions are performed by using hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for detailed working processes of the foregoing system, apparatus, and units, refer to corresponding processes in the foregoing method embodiments. Details are not described herein again.

In the several embodiments provided in this application, it should be understood that the disclosed system, apparatus, and methods may be implemented in other manners. For example, the foregoing apparatus embodiment is merely an example. For example, division into the units is merely logical function division and there may be another division manner during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to other approaches, or all or some of the technical solutions may be implemented in the form of a software product. The computer software product is stored in a storage medium and includes several instructions for instructing a computer device (which may be a personal computer, a server, a network device/server, or the like) to perform all or some of the steps of the methods in embodiments of this application. The foregoing storage medium includes any medium that can store program code, such as a Universal Serial Bus (USB) flash drive, a removable hard disk, a read-only memory, a random access memory, a magnetic disk, or an optical disc.

What is claimed is:

1. A first network device, comprising:
a memory configured to store computer-executable instructions; and
one or more processors coupled to the memory and configured to execute the computer-executable instructions to cause the first network device to:
send, to a second network device, a first message for establishing a first connection to the second network device when the second network device is needed to assist the first network device in obtaining information related to computing a forwarding path of a packet, wherein the packet belongs to a service, and wherein the second network device is on the forwarding path of the packet and is associated with a service requirement of the service; and
send, to the second network device, a second message using the first connection,
wherein the second message requests the second network device to assist in obtaining the information related to the forwarding path,
wherein the forwarding path is based on the service requirement,
wherein the second network device, based on the forwarding path of the packet, is a stitching node for allocating a stitching label,
wherein the second message comprises label stack information, and
wherein the second message instructs the second network device to allocate the stitching label corresponding to the label stack information.

2. The first network device of claim 1, wherein the one or more processors are further configured to execute the computer-executable instructions to cause the first network device to receive a third message from the second network device, and wherein the third message comprises the information related to the forwarding path.

3. The first network device of claim 2, wherein the one or more processors are further configured to execute the computer-executable instructions to cause the first network device to determine the second network device on the forwarding path by:
determining, based on the service requirement, that the network device cannot obtain the forwarding path of the packet through computation; and
determining the second network device based on a network topology for assisting the network device in computing a first path to a destination device.

4. The first network device of claim 3, wherein the second message instructs the second network device to compute the first path to the destination device, and wherein the third message comprises indication information of the first path.

5. The first network device of claim 3, wherein the one or more processors are further configured to execute the computer-executable instructions to cause the first network device to determine that the network device cannot obtain the forwarding path by:
determining, based on the service requirement, that the destination device of the packet is not in a first area, wherein the first area is an area in which the network device is located; and
determining the second network device based on a network topology of the first area, wherein the second network device is boundary equipment of the first area and a second area, and wherein the destination device is located in the second area or the forwarding path passes through the destination device in the second area.

6. The first network device of claim 5, wherein the computer-executable instructions that when executed by the one or more processors further cause the network device to:
establish a second connection to a third network device, wherein the network topology is associated with the third network device, and wherein the third network device is the boundary equipment of the first area and the second area;
send a fourth message to the third network device using the second connection, wherein the fourth message is configured to instruct the third network device to compute a second path to the destination device;
receive a fifth message from the third network device, wherein the fifth message comprises indication information of the second path; and
obtain a part of or all of the forwarding path of the packet based on the third message and the fifth message.

7. The first network device of claim 1, wherein the one or more processors are further configured to execute the computer-executable instructions to cause the first network device to determine the second network device on the forwarding path of the packet by:
determining, based on the service requirement, that the network device cannot determine the information related to the forwarding path of the packet; and
determining the second network device for assisting in determining the information related to the forwarding path.

8. The first network device of claim 1, wherein the information related to the forwarding path comprises at least one of the stitching label indicating the forwarding path or a path label indicating the forwarding path.

9. The first network device of claim 1, wherein the one or more processors are further configured to execute the computer-executable instructions to cause the first network device to determine the second network device is the stitching node by:
determining, based on the forwarding path of the packet, that a quantity of labels that indicate the forwarding path is greater than a maximum quantity of labels that a label stack can carry; and
determining the second network device based on the forwarding path, wherein the second network device is on the forwarding path of the packet.

10. The first network device of claim 1, wherein the first connection comprises a Path Computation Element Communication Protocol (PCEP) connection.

11. The first network device of claim 1, wherein the one or more processors are further configured to execute the computer-executable instructions to cause the first network device to:
- establish a Transmission Control Protocol (TCP) connection to the second network device; and
- further send the first message to the second network device using the TCP connection for negotiating with the second network device to establish the first connection.

12. The first network device of claim 1, wherein the network device is a head-end node device on the forwarding path of the packet.

13. The first network device of claim 12, wherein the first network device and the second network device are path computation client (PCC) devices on the forwarding path.

14. The first network device of claim 1, wherein the forwarding path of the packet comprises at least one of a segment routing (SR) policy path, a segment routing over Internet Protocol version 4 (SRv4) path, a segment routing over IP version 6 (SRv6) path, a segment routing traffic engineering (SR-TE) path, or a multi-protocol label switching traffic engineering (MPLS-TE) path.

15. A service processing method implemented by a first network device, wherein the service processing method comprises:
- sending, to a second network device, a first message for establishing a first connection to the second network device when the second network device is needed to assist the first network device in obtaining information related to computing a forwarding path of a packet, wherein the packet belongs to a service, and wherein the second network device on the forwarding path of the packet is associated with a service requirement of the service; and
- sending, to the second network device, a second message using the first connection,
- wherein the second message requests the second network device to assist in obtaining the information related to the forwarding path,
- wherein the forwarding path is based on the service requirement,
- wherein the second network device, based on the forwarding path of the packet, is a stitching node for allocating a stitching label,
- wherein the second message comprises label stack information, and
- wherein the second message instructs the second network device to allocate the stitching label corresponding to the label stack information.

16. The service processing method of claim 15, further comprising receiving a third message from the second network device, wherein the third message comprises the information related to the forwarding path.

17. The service processing method of claim 15, wherein determining the second network device on the forwarding path comprises:
- determining, based on the service requirement, that the first network device cannot determine the information related to the forwarding path of the packet; and
- determining the second network device for assisting in determining the information related to the forwarding path.

18. The service processing method of claim 15, wherein the information related to the forwarding path comprises at least one of the stitching label indicating the forwarding path or a path label indicating the forwarding path.

19. A computer program product comprising computer-executable instructions stored on a non-transitory computer-readable storage medium that when executed by one or more processors, cause a first network device to:
- send, to a second network device, a first message for establishing a first connection to the second network device when the second network device is needed to assist the first network device in obtaining information related to computing a forwarding path of a packet, wherein the packet belongs to a service, and wherein the second network device on the forwarding path of the packet is associated with a service requirement of the service; and
- send, to the second network device, a second message using the first connection,
- wherein the second message requests the second network device to assist in obtaining the information related to the forwarding path,
- wherein the forwarding path is based on the service requirement,
- wherein the second network device, based on the forwarding path of the packet, is a stitching node for allocating a stitching label,
- wherein the second message comprises label stack information, and
- wherein the second message instructs the second network device to allocate the stitching label corresponding to the label stack information.

* * * * *